United States Patent [19]

VanderSpek et al.

[11] Patent Number: 5,440,722

[45] Date of Patent: Aug. 8, 1995

[54] SYSTEM BUS MONITOR FOR COMPILING DATA REGARDING USE OF A SYSTEM BUS

[75] Inventors: Adrian T. VanderSpek, Worcester; Edward A. Bennett, Upton; Dana M. Richmond, Hopkinton; Christopher A. Ramos, Acton; Joseph V. Aurelio, Mendon, all of Mass.

[73] Assignee: Banyan Systems, Inc., Westboro, Mass.

[21] Appl. No.: 918,863

[22] Filed: Jul. 22, 1992

Related U.S. Application Data

[63] Continuation-in-part of Ser. No. 733,023, Jul. 22, 1991, abandoned.

[51] Int. Cl.⁶ .............................................. G06F 11/34
[52] U.S. Cl. ..................... 395/183.19; 364/DIG. 1; 364/264; 364/264.4; 395/184.01; 395/183.22; 395/183.14
[58] Field of Search ...................................... 395/575; 364/200 MS File

[56] References Cited

U.S. PATENT DOCUMENTS

| | | | |
|---|---|---|---|
| 4,367,525 | 1/1983 | Brown et al. | 395/275 |
| 4,435,759 | 3/1984 | Baum et al. | 395/250 |
| 4,503,495 | 3/1985 | Boudreau | 395/725 |
| 4,521,849 | 6/1985 | Wilder, Jr. | 395/575 |
| 4,636,941 | 1/1987 | Suko | 395/575 |
| 4,843,557 | 6/1989 | Ina et al. | 364/431.11 |
| 4,949,252 | 8/1990 | Hauge | 371/29.1 |
| 4,985,894 | 1/1991 | Suga | 371/16.5 |
| 5,111,460 | 5/1992 | Botzenhardt et al. | 371/29.1 |
| 5,128,885 | 7/1992 | Janis et al. | 395/575 |
| 5,193,179 | 3/1993 | Laprade et al. | 395/575 |
| 5,293,384 | 3/1994 | Keeley et al. | 371/16.3 |

OTHER PUBLICATIONS

Reijns, G. et al., "Design of a Hardware Computer Performance Monitor", *Advances in Microprocessing and Microprogramming*, 1984, Elsevier Science Pub., pp. 63–69.

*Primary Examiner*—Stephen M. Baker
*Attorney, Agent, or Firm*—Hale and Dorr

[57] ABSTRACT

A method and apparatus for monitoring electrical signals within a system bus to compile statistics regarding the use of the bus by each of a plurality of circuit boards. The apparatus includes a trace memory for storing samples of the bus's electrical signals. A processor analyzes the samples to detect bus cycles, determines which of the circuit boards initiated the bus cycles, and prepares statistics regarding the use of the system bus by each circuit board. A display system prepares illustrations, such as graphs, which depict selected statistics. The apparatus also includes an application status register for storing information regarding the status of software executed by a processor board. The software sets a bit of the application status register to indicate that a specified event has begun and clears the bit to indicate that the specified event has terminated. The apparatus includes circuitry for reading the application status register to monitor the event.

11 Claims, 31 Drawing Sheets

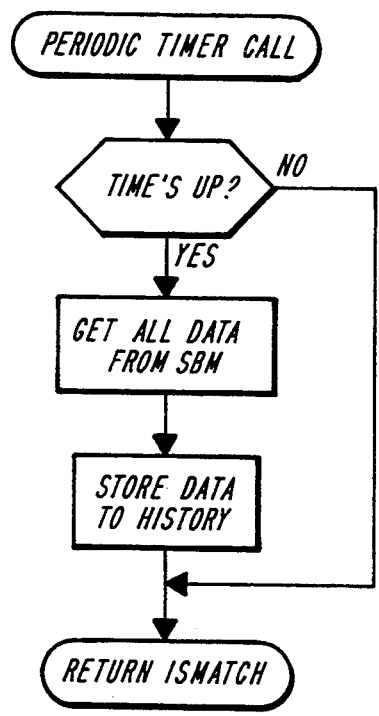
FIG. 15
FIG. 19B
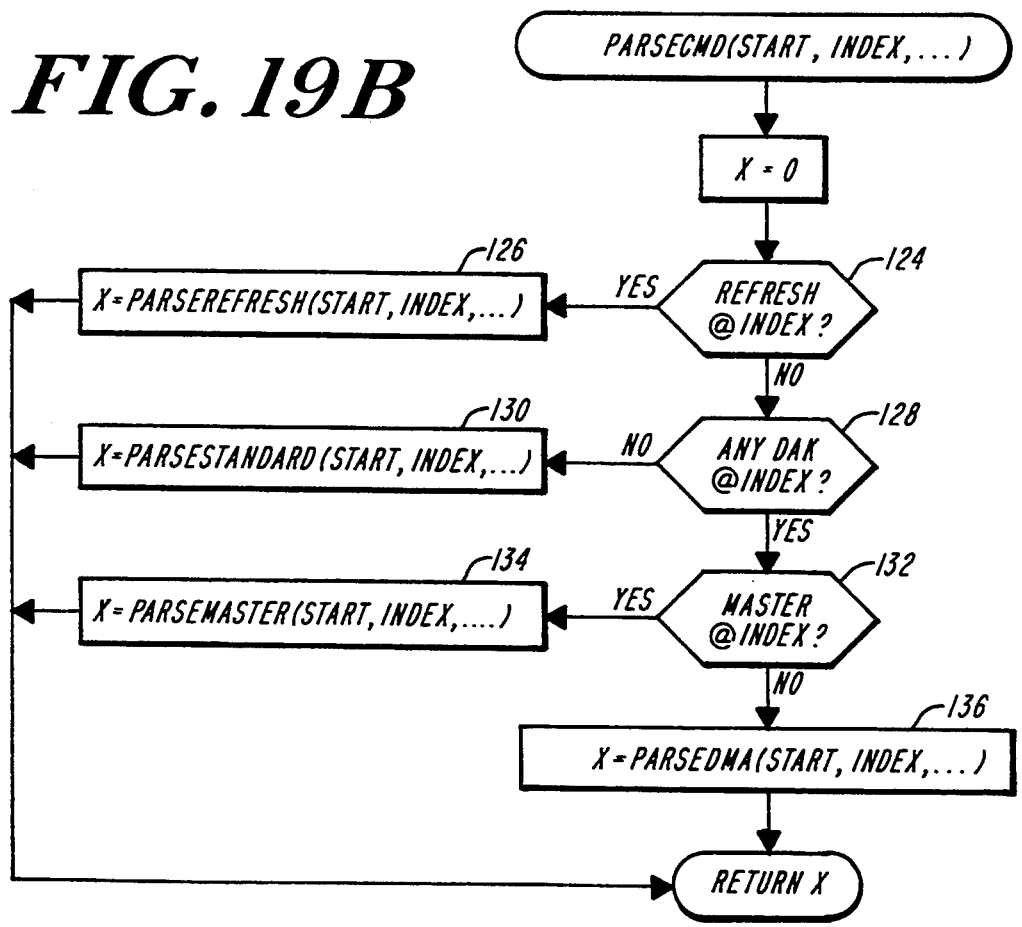

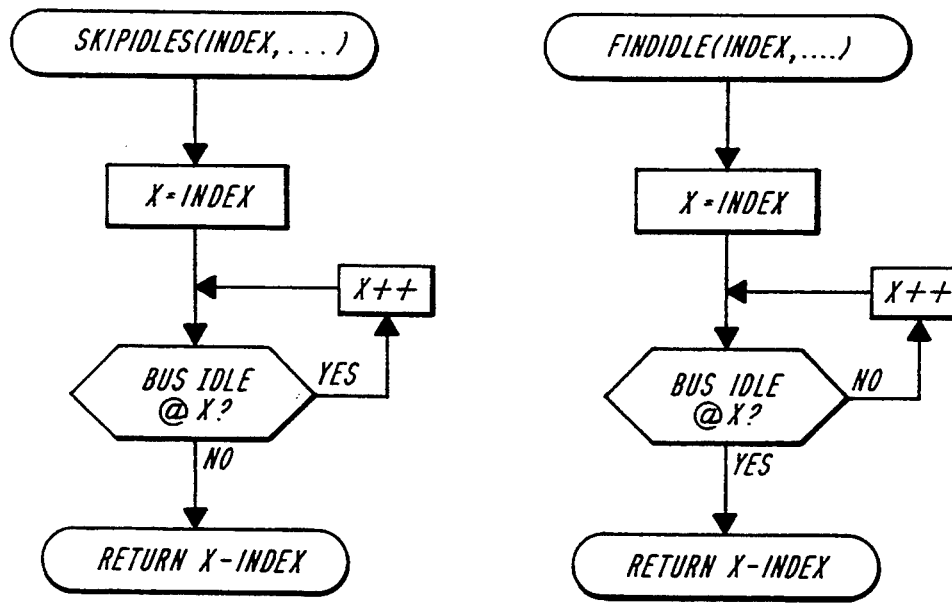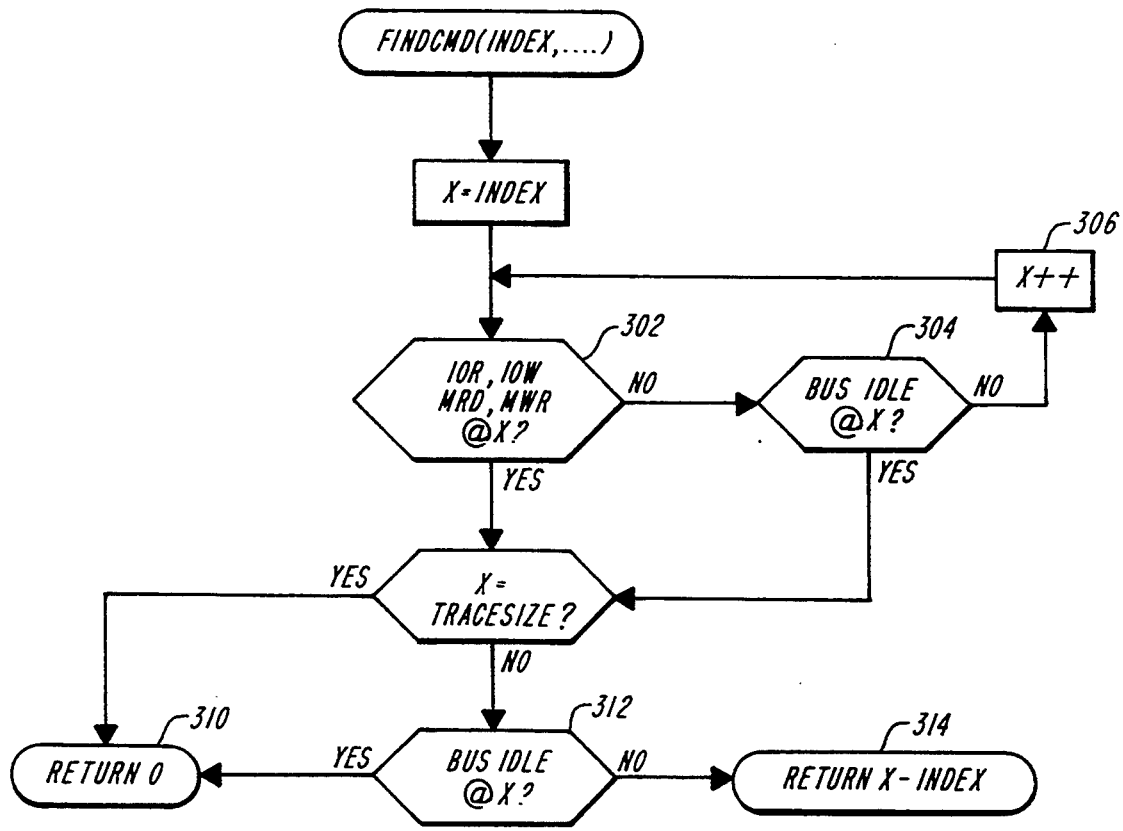
FIG. 19I

SYSTEM BUS MONITOR FOR COMPILING DATA REGARDING USE OF A SYSTEM BUS

CROSS REFERENCE TO RELATED APPLICATION

This application is a continuation in part application of United States Ser. No. 733,023 filed Jul. 22, 1991, now abandoned.

FIELD OF THE INVENTION

The invention relates to a method and apparatus for monitoring the electrical signals on a computer bus such as the bus of a fileserver node of a computer network.

BACKGROUND OF THE INVENTION

Computer networks include a plurality of nodes which communicate with each other over a high speed communication link. During periods when many nodes are communicating over the network, a given node may experience a significant degradation in performance. For example, the node may need to wait for data from other nodes connected to the network, or other nodes may place excessive demands on the node. Network administrators attempt to diagnose the source of the performance degradation and modify the node or network to improve performance.

To diagnose system performance, the network administrator requires tools for measuring the behavior of the nodes. This task is complicated by the variety of types of nodes which may be connected to the network. Further, the means for monitoring the node in interest must not significantly degrade performance of the system.

It is therefore a principal object of the present invention to provide a system bus monitor which will enable the monitoring of a node on a network.

SUMMARY OF THE INVENTION

The invention relates to a method and apparatus for monitoring electrical signals within a system bus of a computer device such as a network file server node. The apparatus compiles statistics regarding the use of the bus by each of a plurality of circuit boards. The apparatus includes a trace memory for storing samples of electrical signals of the bus. A processing means analyzes the samples to detect bus cycles and determines which of the circuit boards is associated with the bus cycles.

In preferred embodiments, the apparatus includes a means for determining the characteristics of sample bus cycles and compiling therefrom statistics regarding the use of the system by each circuit board. A display system receives a user's requests for selected bus statistics and displays the requested statistics.

In preferred embodiments, the apparatus also includes an application status register for storing information regarding the status of software executed by a processor board. The software sets a bit of the application status register to indicate that a specified event has begun and clears the bit to indicate that the specified event has terminated. The apparatus includes a means for reading the application status register to monitor the event.

These and other objects, features and advantages of the invention will be more fully described in the following description of the preferred embodiments which should be read in connection with the accompanying drawings in which corresponding reference numerals refer to corresponding parts throughout the several views.

BRIEF DESCRIPTION OF THE DRAWINGS

FIG. 15 is a flow chart of SBM control software.

FIGS. 19a–19k are flow charts of the procedures for resolving the beginning and end of a cycle of each of a variety of types of cycles.

DETAILED DESCRIPTION OF THE PREFERRED EMBODIMENT

Figure 1:
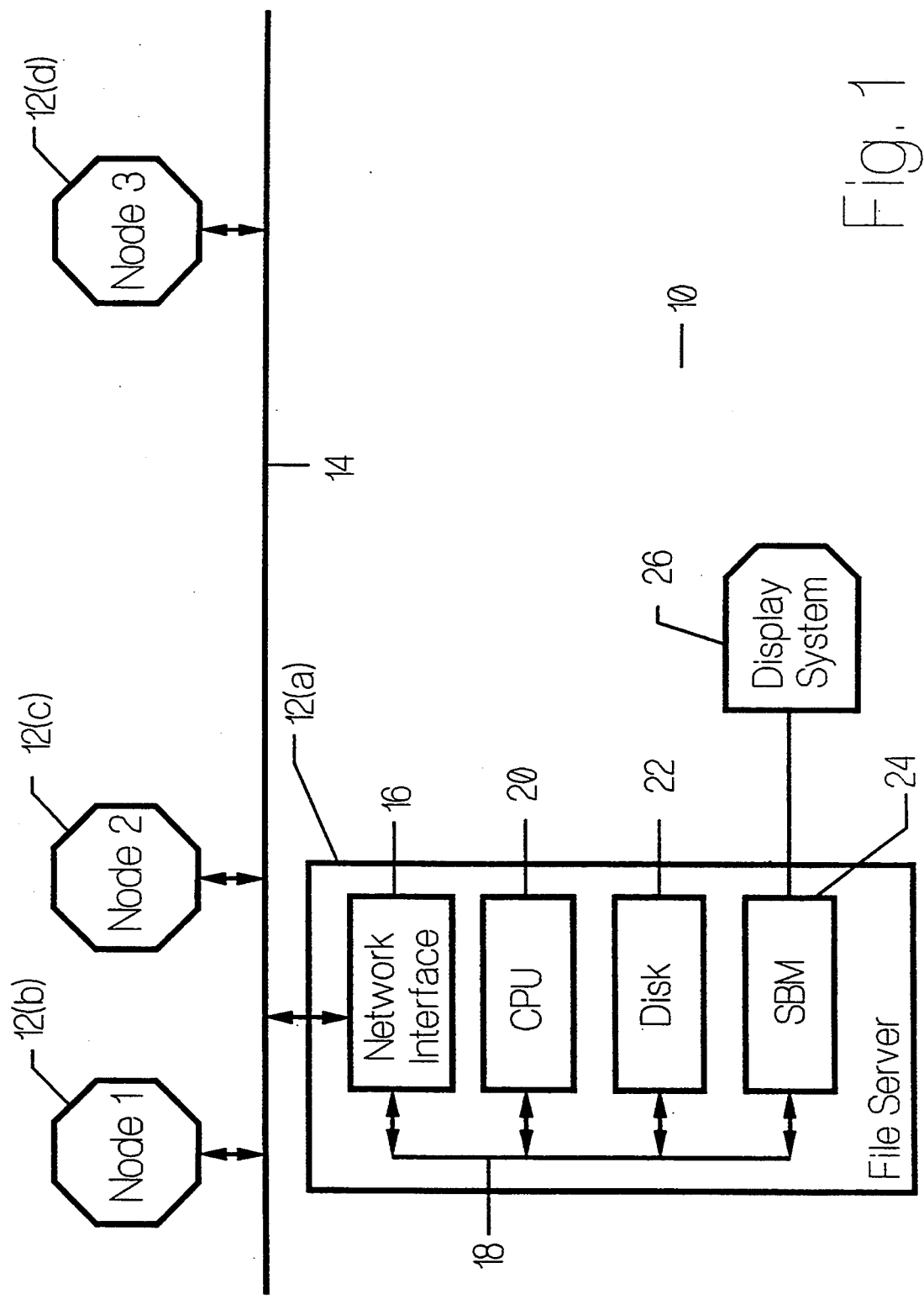
FIG. 1 is block diagram of a computer network which includes a fileserver node having a system bus monitor (SBM).

Referring to FIG. 1, a network 10 includes a plurality of nodes 12(a–d) (e.g. computers and computer peripherals) which communicate with each other over a high speed communication link 14. The term "communication link" is being used in this application to refer to a data communication system that spans a physical area providing high speed communication between physically separate computing systems.

Network 10 includes a fileserver node 12(a) for maintaining disk files which contain information and software used by other network nodes. During periods when many nodes simultaneously request access to the fileserver, the fileserver may be delayed in providing the requested files. Network administrators attempt to modify the fileserver to reduce such delays thereby improving network performance. Accordingly, as explained more fully below, the fileserver includes a means for assisting a network administrator in diagnosing the source of such delays.

The fileserver node 12(a) includes a plurality of circuit boards connected to a shared "bus" 18 over which the boards communicate with each other. (In the preferred embodiment, the bus conforms to either the ISA or EISA bus specifications). For example, as data packets arrive at node 12(a) from link 14, a network interface board 16 obtains control of bus 18 and forwards the packet data over the bus to a central processing unit board (CPU) 20. If appropriate, CPU 20 will in turn obtain control of the bus and copy the data to a disk interface/controller board 22 for storage on a disk. Similar bus activity occurs when the fileserver retrieves files from the disk for transmission to remote nodes. Thus, during periods when many nodes simultaneously seek access to the fileserver, the bus transactions required to respond to the requests may exhaust the bandwidth of the bus, thereby delaying the ability of the fileserver to respond to certain requests.

Fileserver node 12(a) includes a system bus monitor (SBM) circuit 24 connected to bus 18 for maintaining a digital representation of the bus signals and compiling statistics regarding the history of the bus activity. A Display Station 26 is connected to the SBM to retrieve the statistics and display them for the network administrator.

Figure 2:
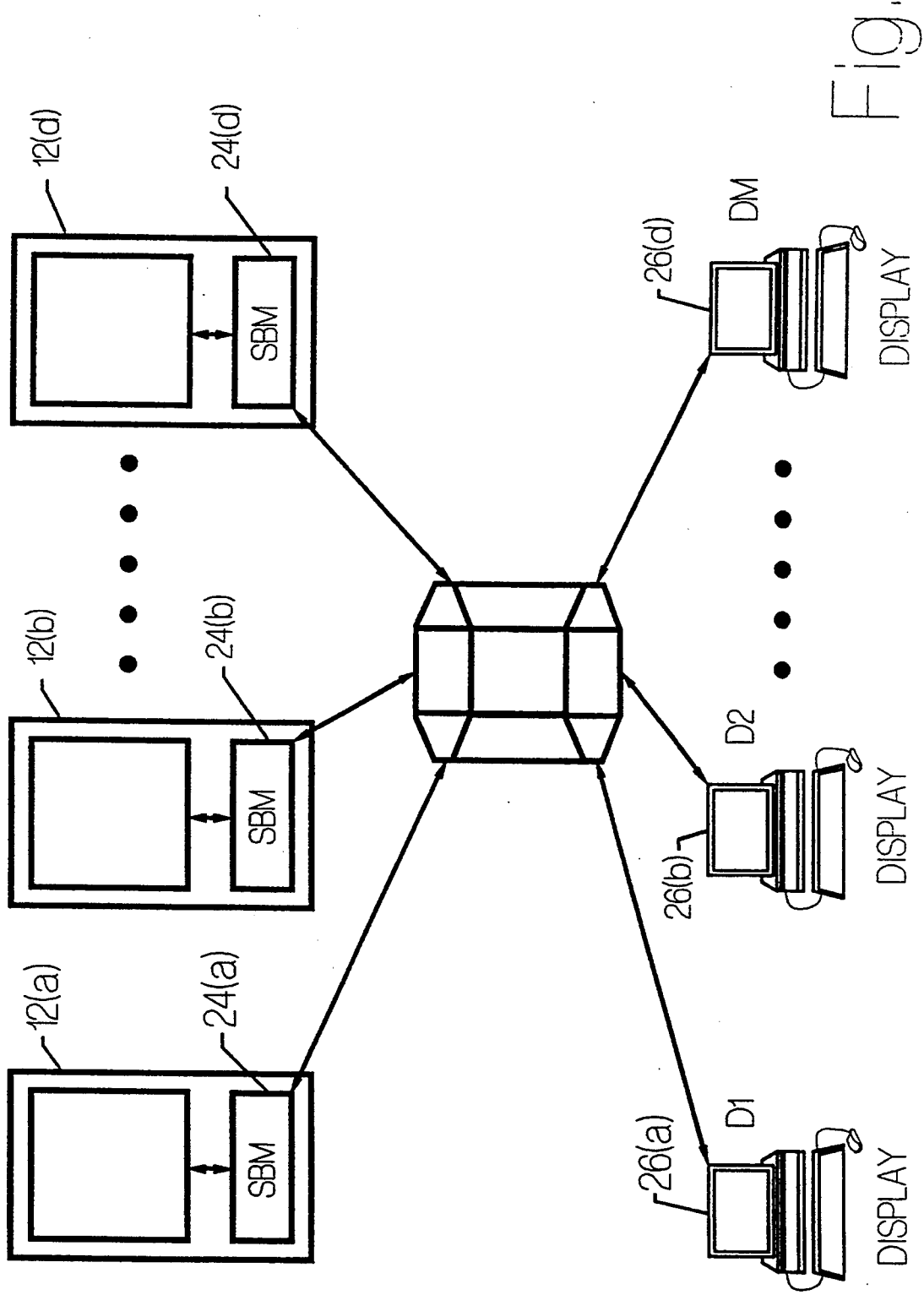
FIG. 2 is a diagram of a plurality of SBM circuits connected to a plurality of display stations.

Referring to FIG. 2, in other embodiments, a plurality of nodes 12(a-d) may each include an SBM circuit 24(a-d) and each SBM circuit may be connected to a plurality of Display Stations 26(a-d). Any of the Display Stations connected to a given SBM circuit may read the data collected by the circuit and any Display Station can control an SBM circuit.

In the preferred embodiment, the Display Station 26 is a properly programmed personal computer. Each Display Station 26 includes a Display Control Program for controlling communications between the Display Station 26 and the SBM 24. For example, under the direction of the Display Control Program, the Display Station first requests configuration information from the user which specifies the particular bus statistics desired by the user. The program then initializes the SBM board 24 and enables it to begin compiling the requested statistics. The Display Station 26 then periodically requests the SBM board 24 to provide selected statistics for viewing by the user. These requests are sent via a DOS file handshake mechanism to an SBM Control Program that communicates with the SBM 24.

SBM CIRCUIT

Figure 3:
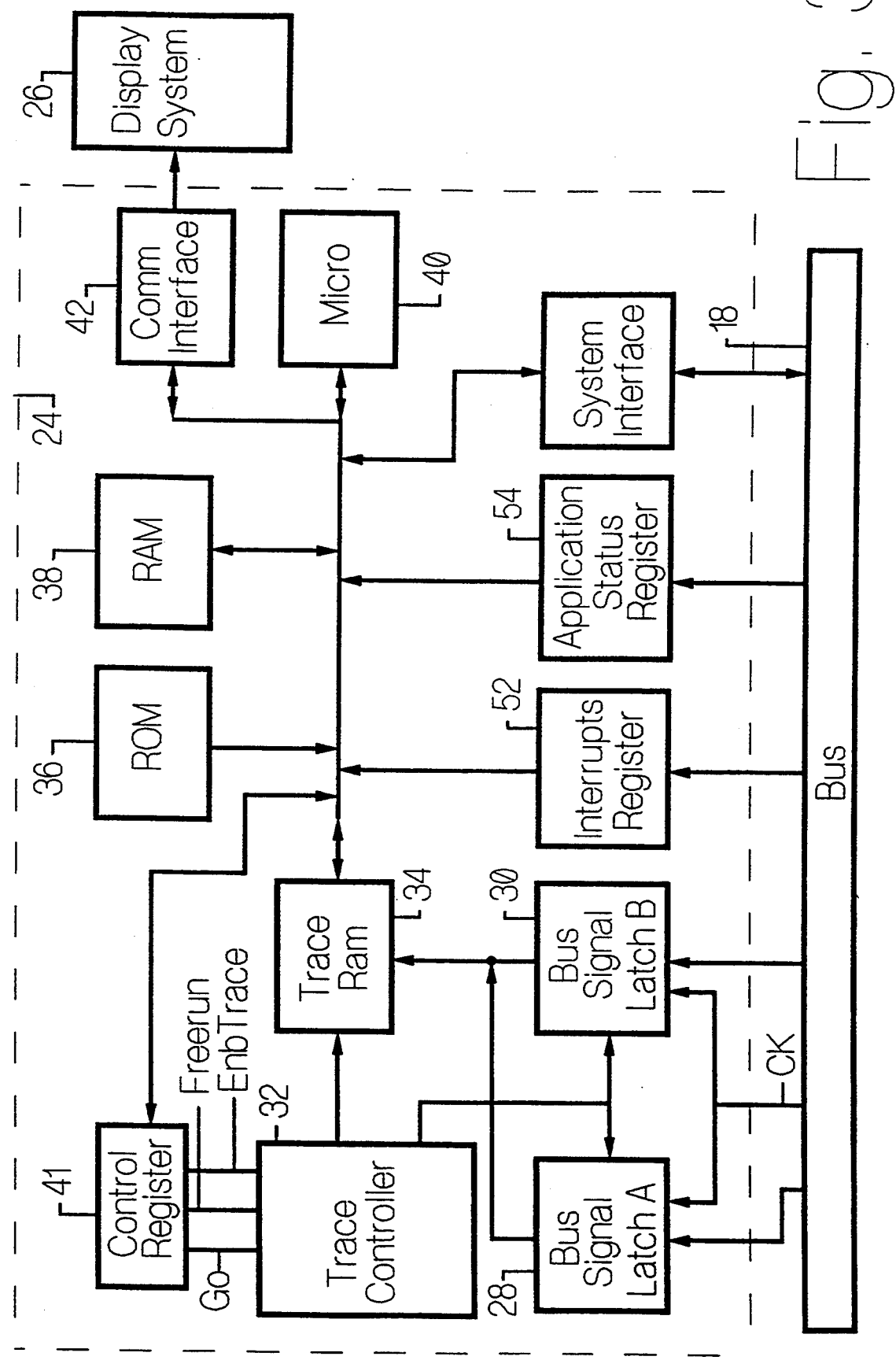
FIG. 3 is a block diagram of an SBM circuit.

Referring to FIG. 3, SBM 24 includes a pair of bus signal latches 28, 30 which latch the status of a selected group of bus signals upon each cycle of a bus clock signal CK. A Trace Controller 32 copies each sample from the latches into a Trace RAM 34 which, in the preferred embodiment, is a high speed (i.e. 45 nsec access time) static RAM. Software routines stored in ROM 36 and RAM 38 are executed by a microprocessor 40 to analyze the stored samples and compile the statistics requested by the user. Microprocessor 40 sends the statistics to a serial communication circuit 42 which forwards the statistics to the Display Station 26.

Figure 4:
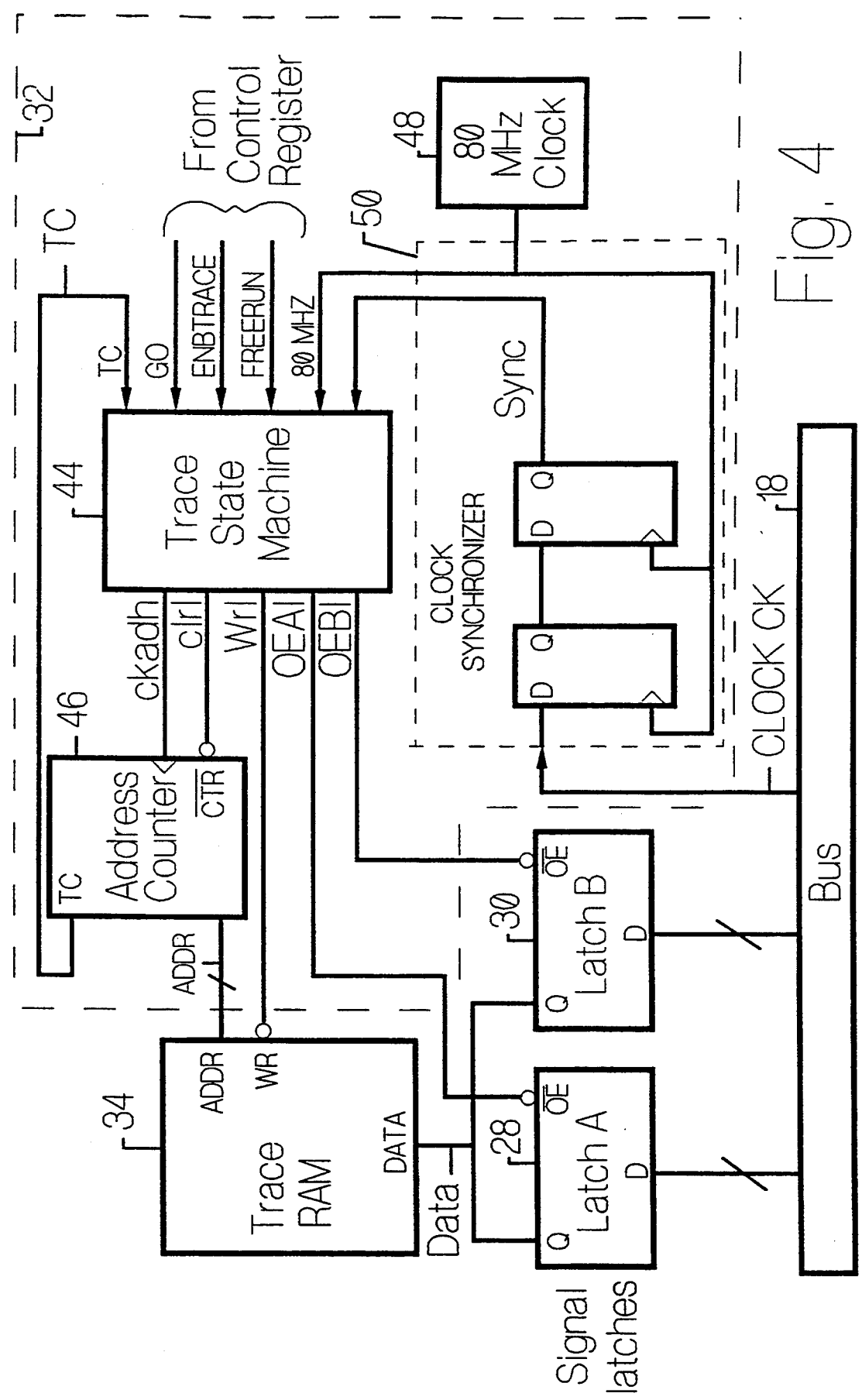
FIG. 4 is a block diagram of Trace Capture Control Circuitry within the SBM circuit of FIG. 3.

Referring to FIGS. 3 and 4, Trace Controller 32 includes a Trace State Machine 44 for controlling the flow of data from latches 28, 30 to the Trace Ram 34. Microprocessor 40 prompts Trace State Machine 44 to begin a trace by setting a "Go" bit in a control register 41. The bit "Go" is hardwired to trace controller 32 to notify the controller that a trace may begin. Similarly, microprocessor 40 can halt a trace by clearing the "Go" bit.

Once a trace is initiated, the Trace State Machine 44 issues a clock signal ckadh to an Address Counter 46 whose contents drive the address lines ADDR of the Trace RAM. In response to the clock signal, the address counter increments to the next address. Once the address is incremented, the Trace State Machine asserts an enable signal OEAI to the first latch 28 causing the latch to provide its contents on the data input lines DATA of Trace RAM 34. The Trace State Machine then asserts a write signal WRL to the Trace RAM directing the RAM to load data from the First Latch into the appropriate storage location.

To load the contents of the Second Latch 30 into the Trace RAM, the Trace State Machine directs the counter to increment the address and asserts an enable signal OEB1 which enables the second latch to provide its data to the Trace RAM. The Trace State machine then asserts the write signal WRL to the Trace RAM to load the data in the RAM. In this manner, the trace state machine multiplexes the two latches by selectively enabling each latch while instructing the trace RAM to load data. Once a complete trace of bus signals has been stored in the Trace RAM, the Address Counter 46 asserts a Terminal Count signal (TC) to the Trace State Machine to indicate the completion of a trace.

The Trace Controller 32 also includes a free-running 80 Mhz clock 48. The clock CK from the system bus is synchronized to the 80 Mhz clock via a synchronization circuit 50. The Synchronization Circuit generates a signal SYNC on the first rising edge of the 80 Mhz clock following the rising edge of the bus clock CK. Since the latches 28, 30 are loaded on the rising edge of the bus clock ck, the SYNC signal indicates that the next sample of the bus signals is available in the latches.

Figure 5A:
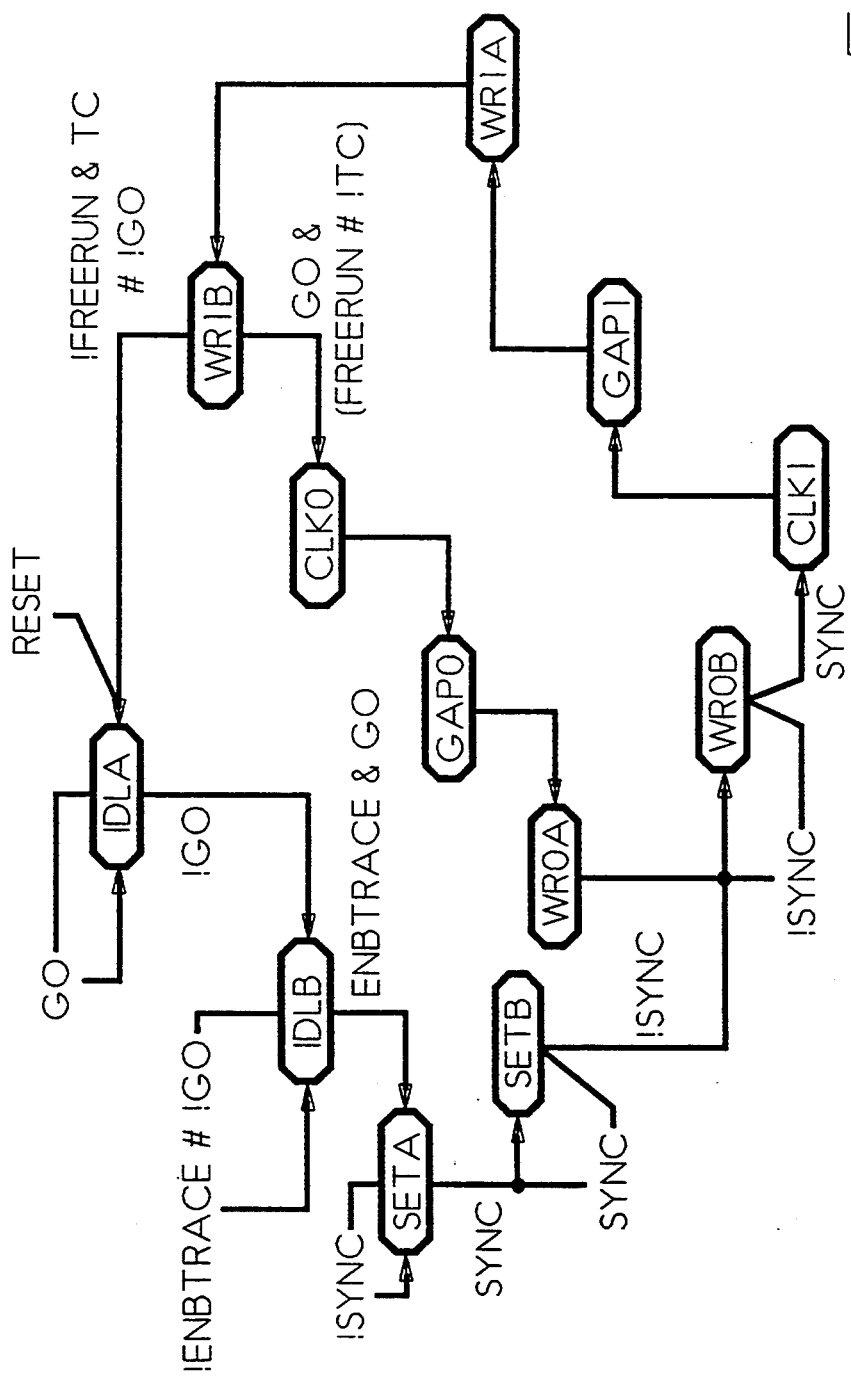
FIG. 5A is a State Diagram illustrating the operation of Trace State Machine.
Figure 5B:
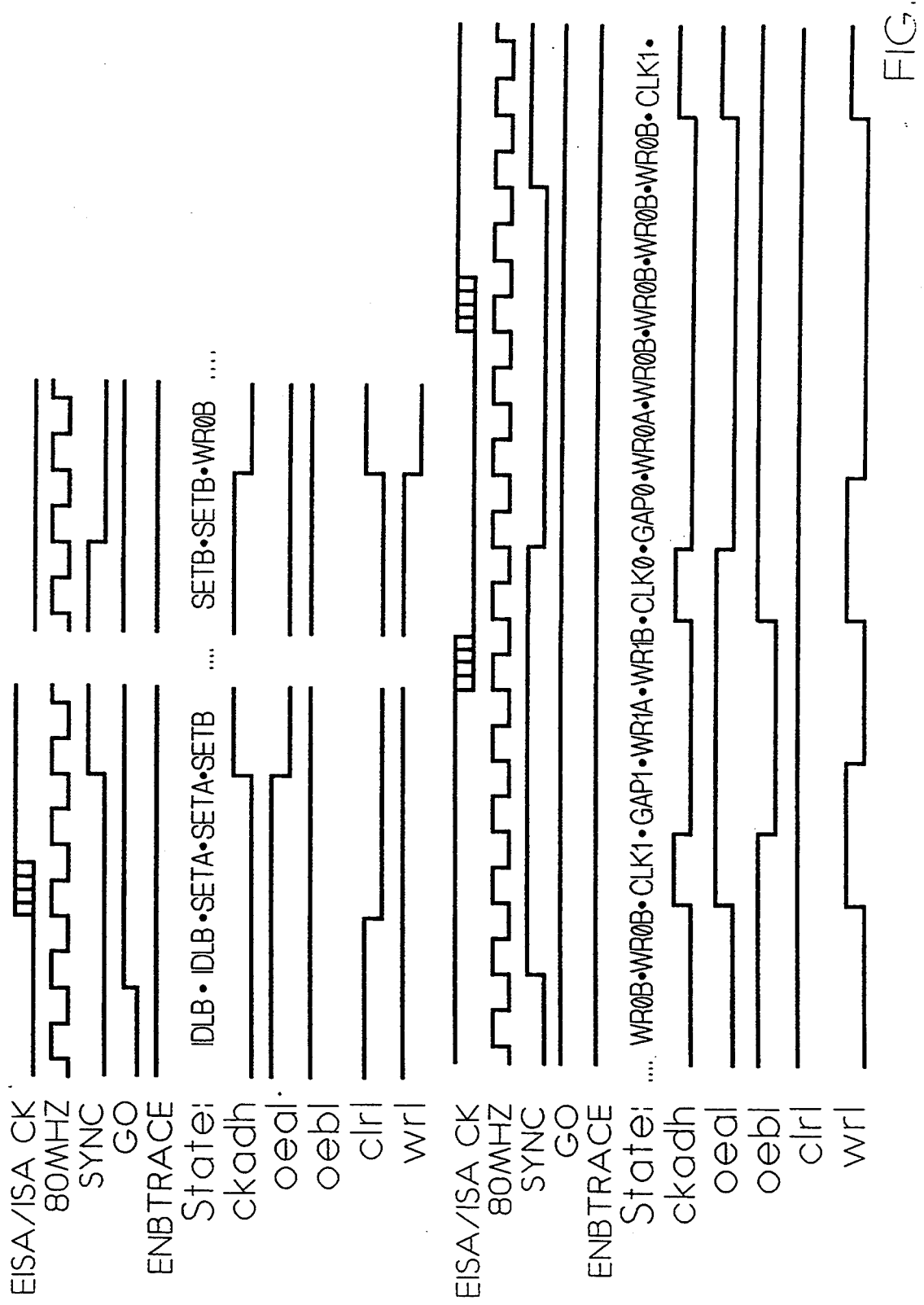
FIG. 5B is a timing diagram illustrating the operation of the Trace State Machine.

FIG. 5A shows a state diagram which models the operation of the Trace State Machine and FIG. 5B is an associated timing diagram. The main loop in the Trace State Machine is paced by the SYNC signal and comprises eight states: CLK0, GAP0, WR0A, WR0B, CLK1, GAP1, WR1A, and WR1B. When the bus clock CK toggles from 0 to 1, it is synchronized to the 80 MHz clock and becomes the signal SYNC. The Trace State Machine waits in state WR0B until it detects SYNC, and then jumps to state CLK1. This prompts the Trace RAM write signal WRL to rise thereby writing the contents of latch 28 to the Trace RAM. It also prompts the Address Counter 46 to increment, and disables latch 28 from driving data. The State Machine then jumps from CLK1 to state GAP1 which enables latch 30 to provide its contents to the Trace RAM. The State Machine then jumps from GAP1 to state WR1A which drops the Trace RAM's write clock signal WRL to prepare for the next write cycle.

The State Machine next moves to state WR1B to check for halt conditions. If these conditions do not exist, the State Machine jumps to state CLK0. If the conditions do exist, the machine enters an IDLA state to halt the trace. A trace will halt if the GO bit of register 41 is not asserted. It will also halt upon detecting the terminal count signal TC, if the "FREERUN" bit in register 41 is not set. As explained above, TC indicates the last location in the Trace RAM has been written and that the trace should stop. The FREERUN bit instructs the Trace State Machine whether to ignore TC and keep running until GO is deasserted.

If a termination condition does not exist, the state machine jumps from state WR1B to CLK0. In CLK0, the trace RAM write signal WRL rises, CKADH is asserted, and OEBL is deasserted, causing latch 30 data to be written to the Trace RAM, the Address Counter to increment, and latch 30 data to stop being driven. The state machine then moves to state GAP0 which drives OEAL thereby enabling latch 28 to assert its contents on the data input lines of the Trace RAM. The State Machine then jumps to state WR0A in which the trace RAM write signal WRL is asserted to begin the next write to the Trace RAM. It then enters a state WR0B in which it waits for SYNC to toggle to a logic one again. Waiting for SYNC ensures that the write will occur after the next set of bus signals is sampled by the latches. Once SYNC occurs, the State Machine goes through the same eight steps again.

The remaining four states in the Trace State Machine are for software control of the state machine and start-up synchronization. In state IDLA, the state machine waits for GO to be deasserted by software. In state IDLB, the state machine waits for both the ENBTRACE bit of register 41 and the GO bit to be asserted before starting another trace. The ENBTRACE bit of register 41 determines which of microprocessor 40 and trace controller 32 can access trace RAM 34. When ENBTRACE is set to one, the Trace Controller is granted access to the Trace RAM. When it is cleared, microprocessor 40 is granted access to the Trace RAM. States SETA and SETB ensure the State Machine is appropriately aligned with SYNC before jumping to state WR0B to begin another trace.

Referring again to FIG. 3, the SBM also includes an Interrupt Register 52 whose contents indicate the status of the interrupt lines of bus 18. Since the interrupt lines do not change very often relative to the bus signals sampled by latches 28, 30, the interrupt lines do not need to be sampled with each cycle of the bus clock. Accordingly, the SBM Control Program simply reads the register at regular intervals to monitor interrupt activity. More specifically, the SBM Control Program sets the Go bit to instruct the Trace Controller 32 to commence sampling the bus signals, and then begins reading the Interrupt Register in a relatively quick loop.

Figure 6:
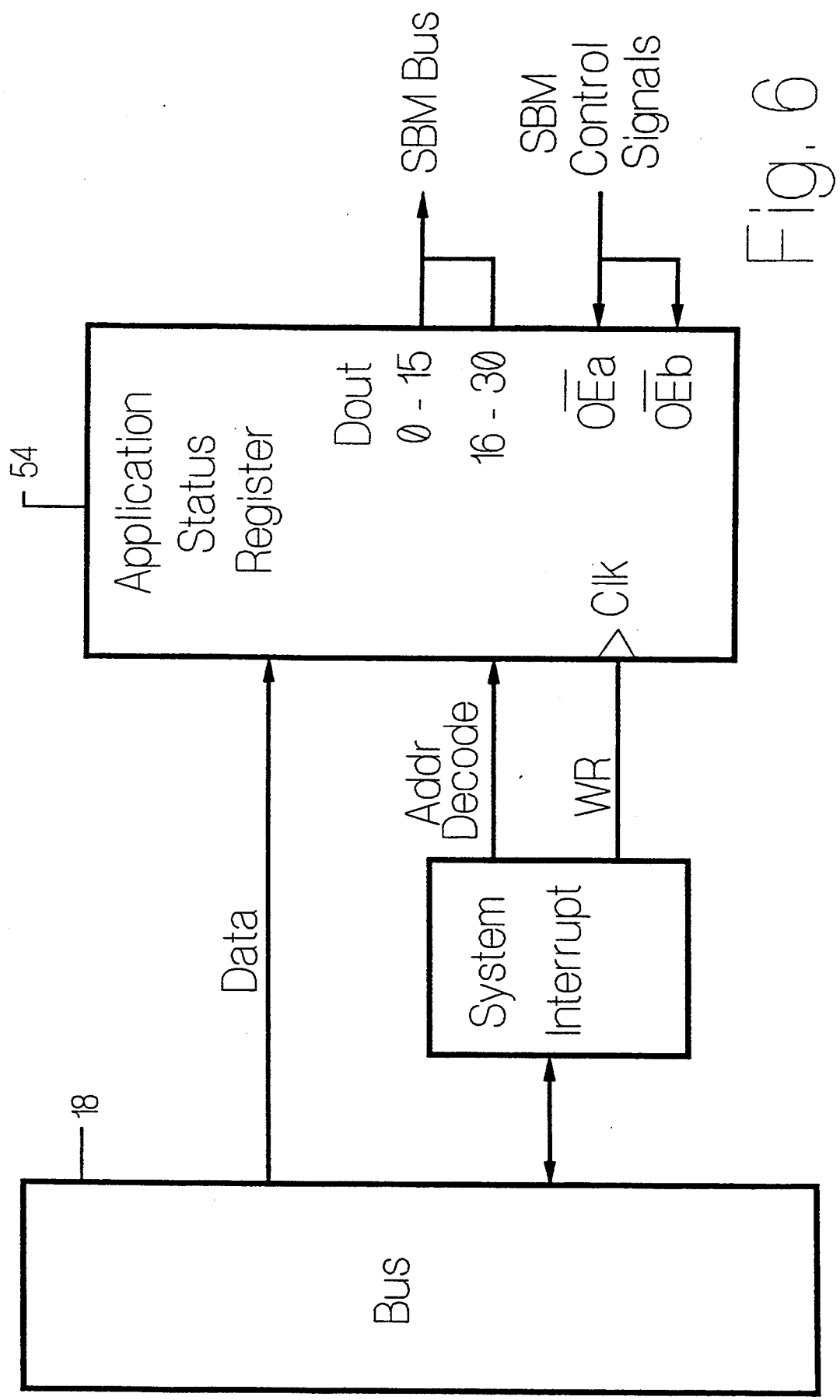
FIG. 6 is a block diagram of the Application Status Register.

Referring to FIGS. 3 and 6, SBM 24 further includes an Application Status Register 54 connected to the bus 18 for storing status information regarding application programs running on the fileserver CPU 20 (See FIG. 1). The Application Status Register 54 resides as an IO device on the bus 18. It appears to the application programs as a pair of 31 bit write only addresses. To set bits in the register, the software writes to a first address A. To clear bits, the software writes to a second address B. Certain application programs set one or more bits of the register upon the occurrence of selected events. For example, whenever an application program running on CPU 20 calls a certain routine, the routine writes to the first address of the Status Register to set selected bits within the register. When returning from the call, the routine writes to the second address to clear the bits.

To the SBM Control Program, the Application Status register appears as a single read only 31 bit register. The SBM Control Program regularly reads the Status Register to prepare statistics regarding the CPU time spent executing the routine and the frequency with which the routine was called. This information can be used to monitor system software performance with minimal overhead to the software being measured.

Since the content of the Status Register typically does not change very quickly, the software loop for reading this register runs at a slower pace than the routine for reading the Interrupt Register. Indeed, if lengthy software events are to be measured, the reading of the Status Register may be interrupt driven.

SBM Software For Trace Analysis

Figure 7:
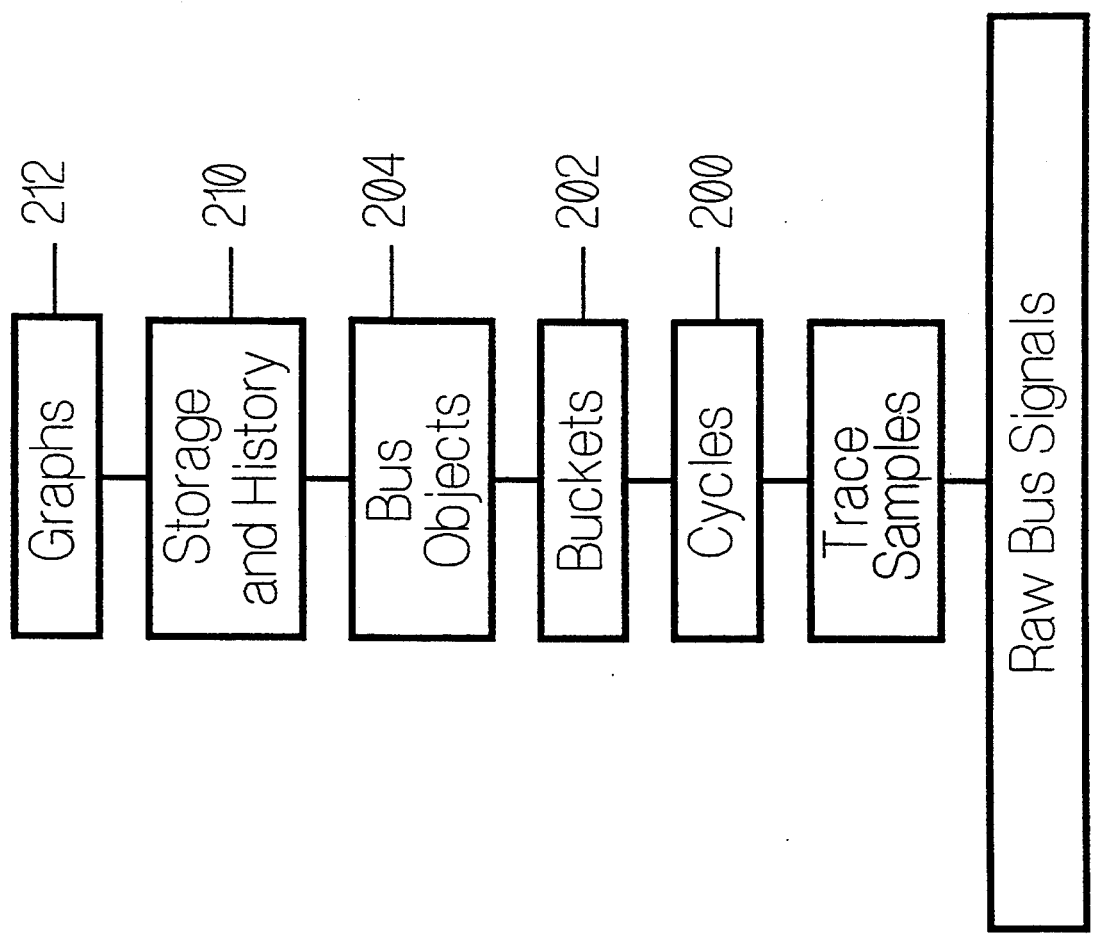
FIG. 7 is a diagram of the hierarchy of SBM data objects.

Referring to FIGS. 3 and 7, once the trace controller has filled the Trace RAM with samples of the bus signals, the SBM software analyzes the samples to locate each bus cycle stored in memory and to determine its type.

The system recognizes 11 basic types of bus cycles. They are:
1: Refresh
2: IO Write
3: IO Read
4: Memory Write
5: Memory Read
6: Master IO Write
7: Master IO Read
8: Master Memory Write
9: Master Memory Read
10: DMA memory read
11: DMA memory write In addition to the 11 types of cycles, the SBM software also keeps track of bus idle, which is when no bus cycle is occurring, and keeps statistics on cycles that were partially captured in the Trace memory.

FIGS. 19a–19k outline how the bus samplings in Trace RAM 34 are parsed into bus cycles. The Trace RAM 34 is treated as an array of 1024 elements, where each element represents a single sample of the bus, and entire array of 1024 elements represents the entire trace sample taken. The routine Parsetrace is called to index through the array of trace samples, and parse out the trace cycles.

Figure 19A:
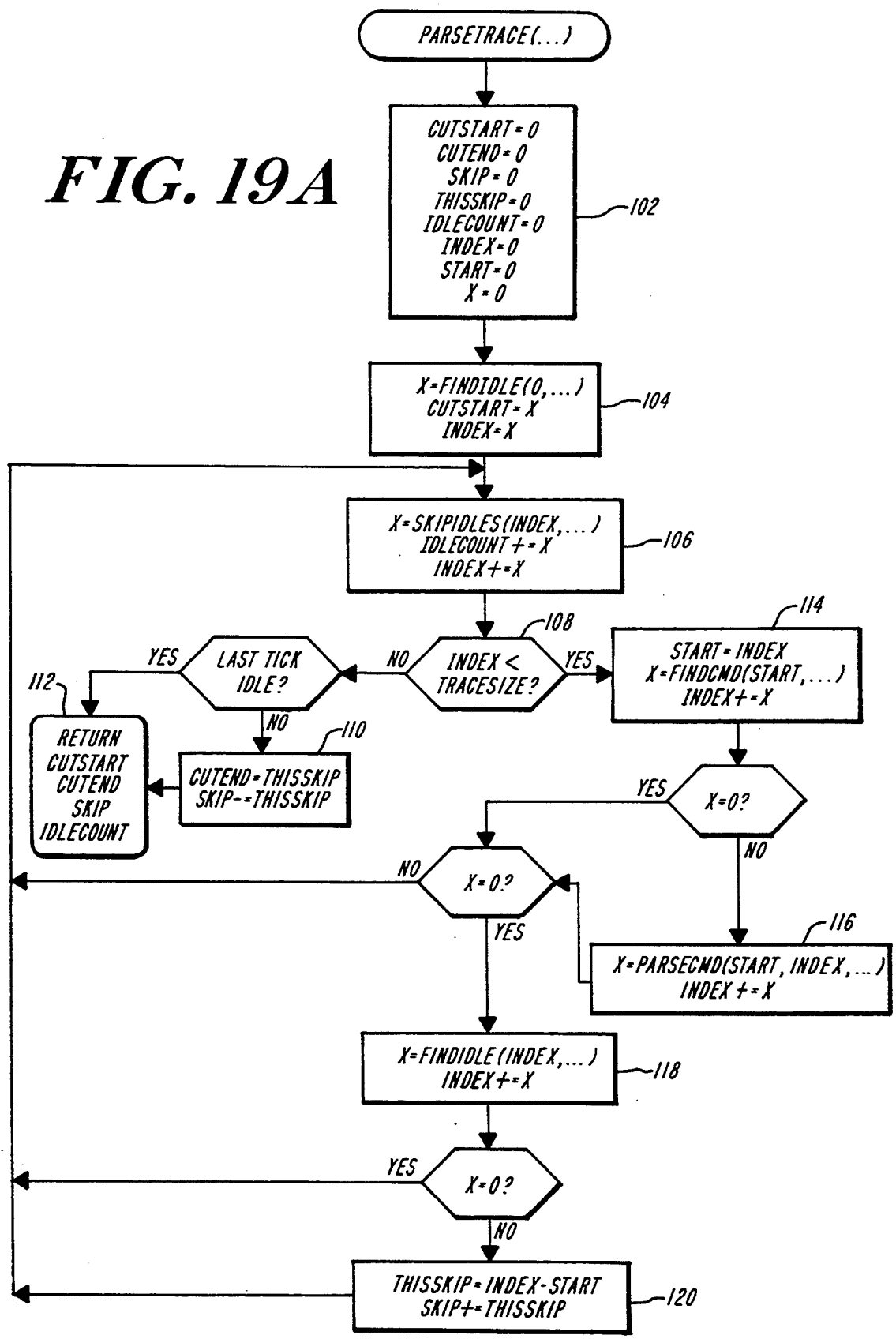

FIG. 19a shows the Parsetrace routine. Parsetrace finds the cycles in the trace, determines their types, determines if any statistics about the encountered cycles should be updated, and then updates them, and returns with general statistics about the trace. The general statistics are "cutstart", "cutend", "skip", and "idleCount". "Cutstart" indicates the number of samples, if any, that were thrown out because a cycle was cut off by the beginning of the trace. "Cutend" indicates the number of samples, if any, that were thrown out because the cycle was cut off by the end of the trace. "Skip" indicates the number of samples, if any, that were skipped because they were not bus idle, but could not be parsed into a valid cycle. "IdleCount" represents the number of samples in the trace in which the bus was idle.

Parsetrace begins in step 102 by initializing the statistic variables and then in step 104 by determining if the trace began in the middle of some cycle. If sampling did begin in the middle of a cycle, that cycle is skipped, and the length skipped is put into the parameter "cutstart". The "cutstart" statistic is used to track cycles that were cut off at the beginning of a trace, and were thrown out because the complete length of the trace cannot be determined.

"Cutstart" is determined by calling procedure findIdle with an index of 0, and putting the result of the call into "cutstart". FindIdle will stop at the first trace sample it finds that is a sample of an idle bus, and returns the number of samples skipped to reach that entry. If the first entry is idle, it will return 0. If the first entry is inside a cycle, it will return the index of the first sample after the end of the cycle. FindIdle is shown in FIG. 19i.

After "cutstart" is determined, the parsetrace procedure enters its main loop in step 106, where it calls skipIdles to find the beginning of the next cycle. SkipIdles goes forward in the trace from the index specified, looking for the first non-idle bus sample encountered. It then returns with the number of samples it skipped. SkipIdles is shown in FIG. 19i. The idleCount statistic is incremented by the number of samples skipped by SkipIdles.

The current index after the call to skipIdles is then checked to see if the end of the trace buffer has been reached in step 108. If the end of the trace has been reached, the "cutend" statistic is updated if needed in step 110, and parsetrace then returns to the caller in step 112, returning "cutstart", "cutend", "skip", and "idleCount". If the end of the trace has not been reached, the current cycle is processed.

The current cycle is processed by calling procedure findCmd in step 114 to determine if the current index into the trace can be parsed into a cycle. FindCmd is shown in FIG. 19i. If findCmd returns an offset, it indicates that the cycle could be parsable, and procedure parseCmd is called in step 116. ParseCmd is shown in FIG. 19b. ParseCmd parses out the entire cycle, and updates any required bus cycle statistics. It returns with the length of the cycle, or 0 if the cycle could not be parsed properly.

A test is then done to see if either findCmd or findIdle returned a 0, indicating the current cycle cannot be parsed. If it is not 0, the current cycle has been properly parsed, and the procedure goes back to the beginning of the loop to parse the rest of the trace. If either findCmd or parseCmd did return a 0, findIdle is called in step 118 to skip to the end of the unparsable cycle. The "skip" parameter is then incremented in step 120 to reflect the number of samples skipped to go over the unparsable cycle, and then the procedure loops to parse the rest of the trace.

When the end of the trace is reached, the last sample in the trace is checked to see if it is idle. If it is not a sample of an idle bus, it indicates some cycle was cut off at the end of the trace. In that case, it is known that the last cycle was skipped as unparsable, and the "skip" counter incremented by its length. "Cutend" and not "skip" is set to be the length of that last cycle, and "skip" is decremented by the same amount. The procedure then returns in step 112 with 4 cycle statistics, "cutstart", "cutend", "skip" and "idleCount".

Figure 19C:
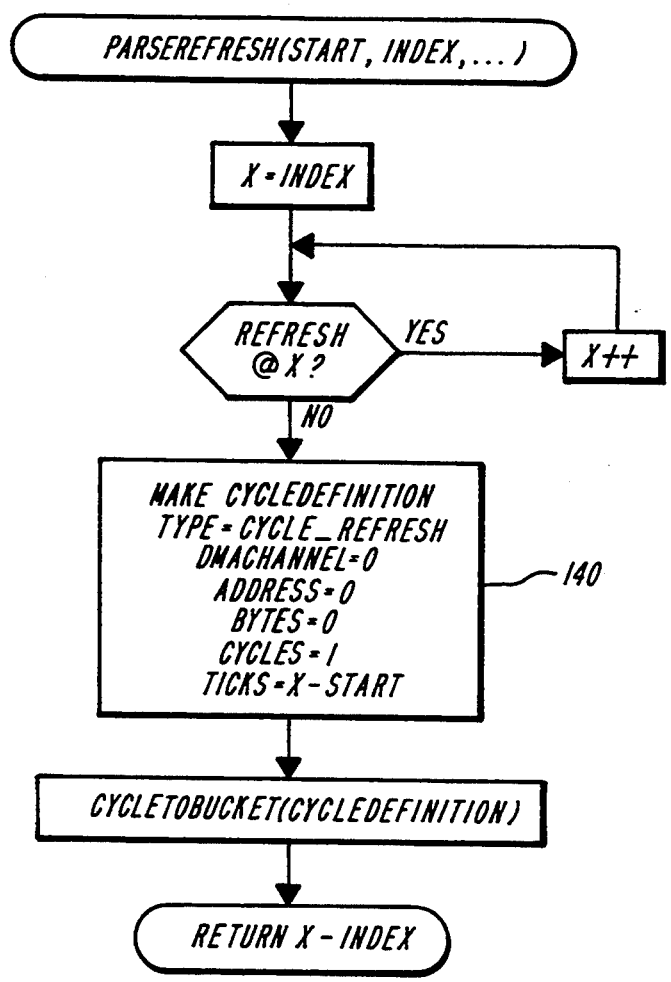

FIG. 19b shows procedure parseCmd. ParseCmd determines the category of the current cycle: i.e., Refresh, Standard, Master or DMA cycle. In step 124, it first checks to see if the signal REFRESH is asserted in the bus sample. If it is, the cycle is assumed to be a Refresh cycle, and parseRefresh is called in step 126. ParseRefresh is shown in FIG. 19c.

Figure 19D:
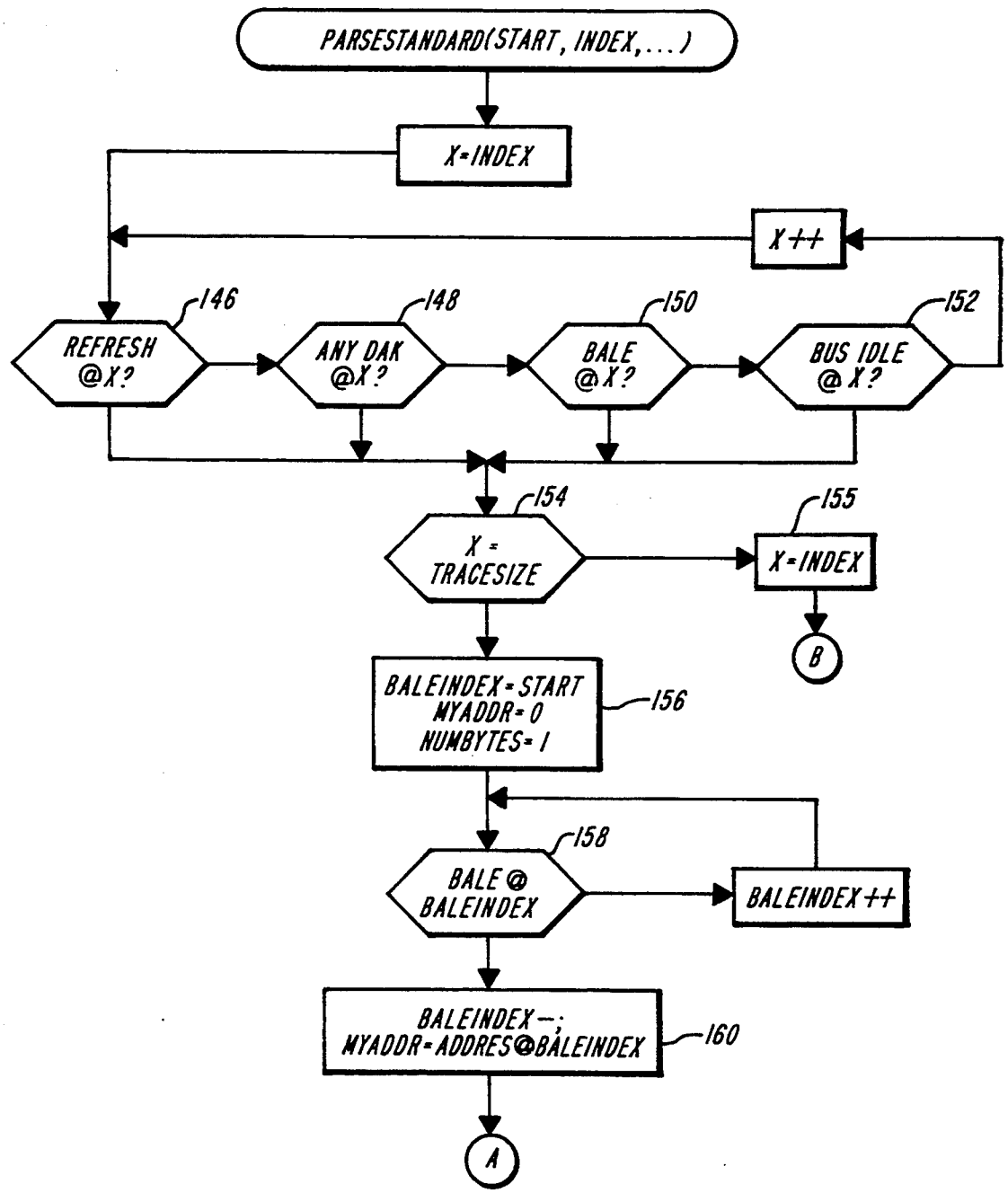

If the REFRESH signal is not asserted in the bus sample, the sample is then checked in step 128 to see if any of DAK0, DAK1, DAK2, DAK3, DAK5, DAK6 or DAK7 are asserted. If none of these signals are asserted, the current cycle is assumed to be a Standard cycle, and parseStandard is called is called in step 130. ParseStandard is shown in FIG. 19d.

If any of the DAKx signals are asserted, the cycle is assumed to be either a Master or a DMA cycle. The bus sample is then checked in step 132 to see if the signal MASTER is asserted. If it is, the cycle is assumed to be a Master cycle, and parseMASTER is called in step 134. It it is not, the cycle is assumed to be a DMA cycle, and parseDMA is called in step 136. ParseMASTER is shown in FIG. 19f, and parseDMA is shown in FIG. 19h.

All of the parsing routines called by parseCmd return with the count of how many traces samples there are from the current index to the end of the current cycle. This information is then passed back as the return value by parseCmd.

FIG. 19c shows the procedure parseRefresh. ParseRefresh is called to parse a section of the trace that is assumed to contain a Refresh cycle. ParseRefresh runs forward in the trace until the signal REFRESH is no longer asserted. It then makes a CycleDefinition object to describe the Refresh cycle.

A CycleDefinition object is used to describe a bus cycle. It contains "Type", "DmaChannel", "Address", "Bytes", "Cycles", and "Ticks" parameters. "Type" identifies which type of cycle this is. "DmaChannel" states which DMA channel, if any, is involved with this cycle. "Address" contains the memory or IO address, if any, accessed on this cycle. "Bytes" states how many data bytes were transferred on this cycle. "Cycles" states how many cycles actually occurred during this period of bus activity. It is always 1 for Refresh and Standard cycles. For DMA and Master cycles, it can be greater than 1. "Ticks" is how many bus samples this cycle spans.

In step 140 for the refresh cycle, "Type" is set to CYCLE-REFRESH, "DmaChannel" is set to 0, "Address" is set to 0, "Bytes" is set to 0, "Cycles" is set to 1, and "Ticks" is set to the number of contiguous samples for which REFRESH is asserted. The CycleDefinition object is then passed in a call to CycleToBucket in step 142, which determines if any statistics need to be updated concerning this cycle, and then updates them. CycleToBucket is shown in FIG. 19j. ParseRefresh then returns with the number of cycles counted from index until the end of the refresh cycle.

Figure 19E:
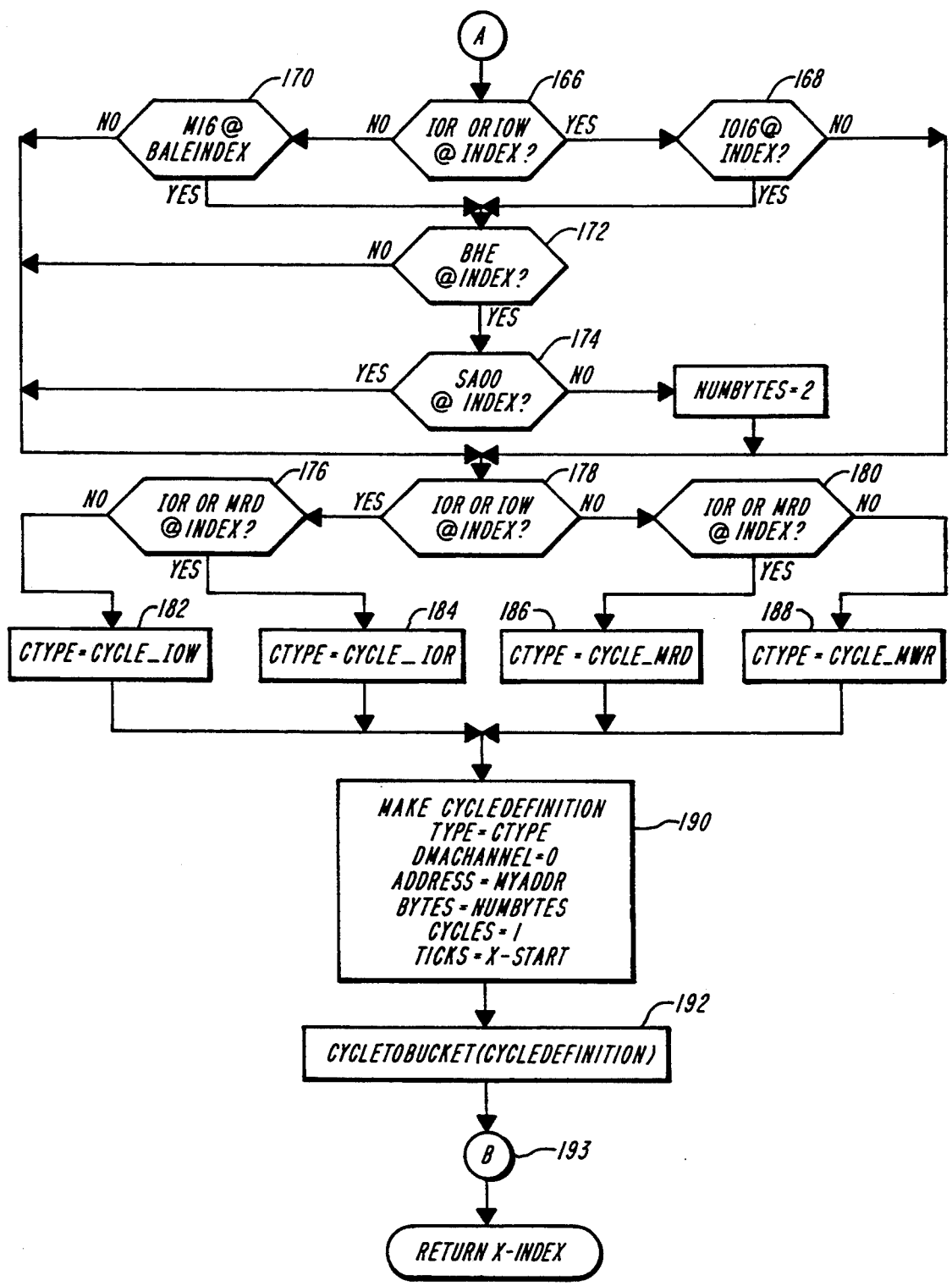
Figure 19F:
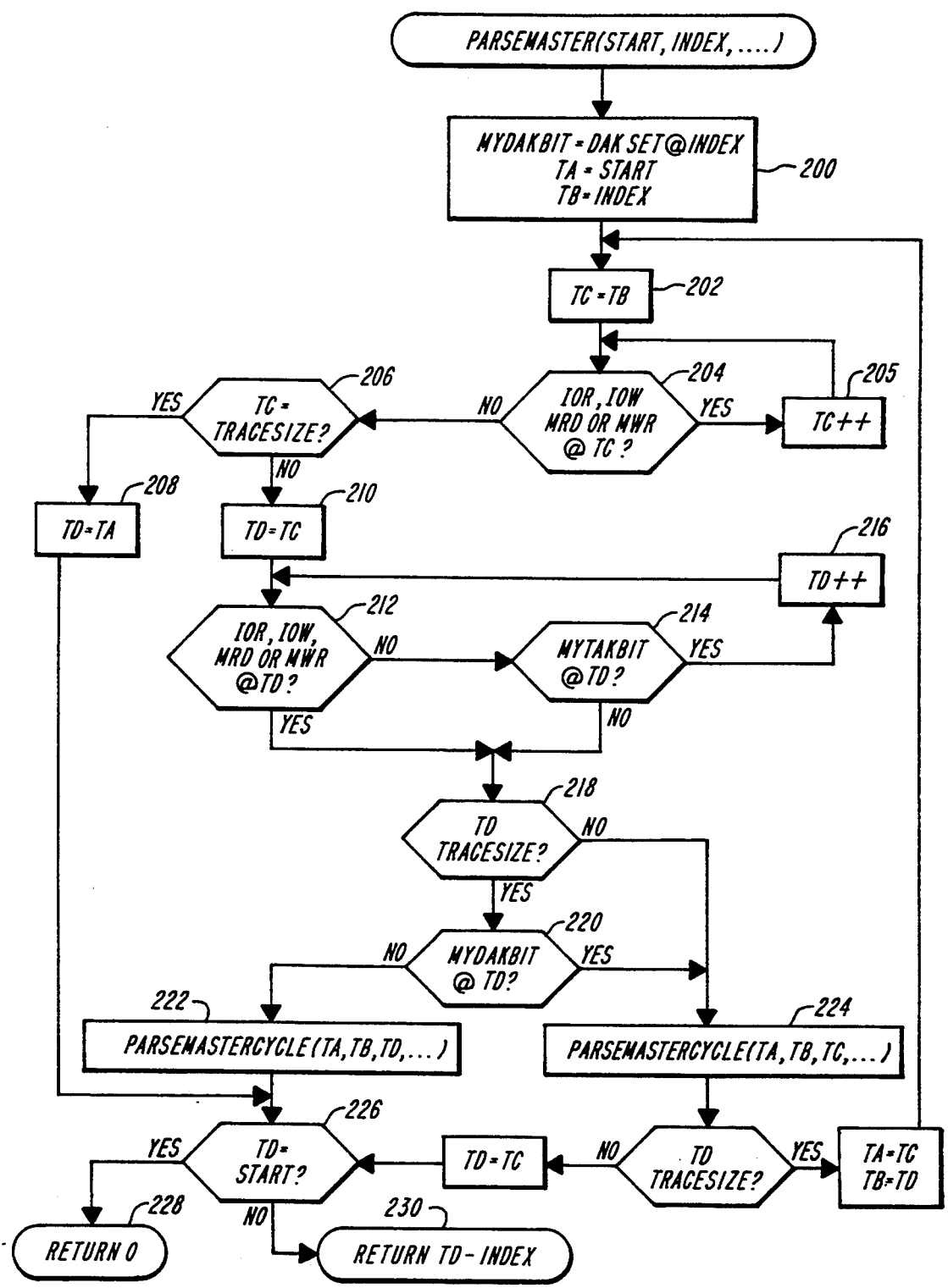

FIGS. 19d and 19e show the procedure parseStandard. It begins by going forward from the index until the end of the current cycle occurs. If the signal REFRESH is encountered as having been asserted in step 146, it means that the current cycle is over, and the next cycle is probably a refresh cycle. If any of DAK0 through DAK7 are encountered as having been asserted in step 148, it indicates that the current cycle is over, and the next cycle is probably a DMA or Master cycle. If BALE is encountered asserted in step 150, it indicates that the current cycle is over, and the next cycle is probably another standard cycle. If an idle bus in encountered in step 152, it indicates that the current cycle is over and the current cycle does not abut the beginning of another cycle.

After the end of the cycle is encountered, a check is done to see if the end of the trace has been reached in step 154. If it has, the parseStandard procedure sets parameter "x" equal to "index" in step 155. Control of the procedure proceeds to step 193 in FIG. 19(e) where the parseStandard procedure returns the value "x-index." This results in parseStandard returning with a value of 0. If the end of the trace has not been reached, the procedure then finds the point in the cycle where the address lines are valid, so that the address accessed on the cycle can be determined.

Standard cycles begin with the signal BALE asserted on the bus. The address used with the cycle is guaranteed to be valid on the trailing edge of BALE. So the parseStandard procedure begins at the start of the cycle, and runs forward until it finds the first sample with Bale not asserted in step 158. It then uses this point to sample the address lines in the trace memory, and assemble the address in step 160.

FIG. 19e shows the flow of parseTrace after the address is assembled. The number of bytes transferred in the cycle is now determined by looking at specific signals on the bus. For IO cycles, the signals IO16, BHE, and SA00 determine the number of bytes transferred. For memory cycles, M16, BHE and SA00 determine the number of bytes.

The procedure begins in step 166 by determining if either IOR or IOW is asserted at index. If they are, the cycle is an IO cycle, and IO16 is sampled at index at step 168 to see if the cycle could be a 16 bit cycle. It if is not set, it is assumed that only 1 byte was transferred. If neither IOR or IOW are asserted at index, the cycle is a memory cycle, and M16 is sampled at the same point as address in step 170. If it is not asserted, it is assumed that only 1 byte was transferred.

If either M16 for a memory cycle, or IO16 for an IO cycle was determined to be asserted, BHE and SA00 are sampled at index in steps 172, 174. If BHE is asserted, and SA00 is not asserted, it indicates that 2 bytes were transferred in the cycle. If BHE is not asserted, or SA00 is asserted, it indicates that only 1 byte was transferred on the cycle.

After the number of bytes transferred is determined, the signals IOR, IOW, MRD, MWR are sampled in steps 176, 178, 180 to determine the cycle type and the type is set to the appropriate value in steps 182, 184, 186,188. The value is either CYCLE_IOW, CYCLE_IOR, CYCLE_MRD, or CYCLE_MWR. Then a CycleDefinition object is created in step 190 with all the information, and passed to CycleToBucket in step 192 to update any pertinent statistics. ParseStandard then returns with a count of the number of trace samples from index until the end of the cycle.

FIG. 19f shows the procedure parseMaster, which is used to parse Master Cycles. Master cycles are more complex than other cycle types. They occur when a device on the bus arbitrates for, and gains bus mastership, indicating that the device can perform any number of memory or IO reads or writes on the bus before relinquishing control. This complicates the parsing of the cycles, since a variable number of bus cycles, and bus cycle types can occur.

ParseMaster uses 4 placemarkers to keep track of its parsing of master cycles, labelled "ta", "tb", "tc", and "td". "Ta" tags the start of the current sub-cycle. "Tb" tags where the IOR, IOW, MRD, or MWR for the cycle begins. "Tc" tags where the IOR, IOW, MRD, or MWR ends, "td" tags either where the IOR, IOW, MRD, or MWR for the next subcycle begins, or where the master cycle terminates.

In step 200, the parsing begins by determining which one of DAK 0 through 7 is asserted. Then "ta" is set to the start of the cycle, and "tb" to the current index. Then the main parsing loop is entered, where the multiple subcycles within the master cycle are parsed out.

The loop begins by setting "tc" to the end of the current command in step 202. It sets "tc" equal to "tb" and then runs forward in steps 204, 205 until the IOR, IOW, MRD or MWR signal is no longer asserted. A check is then done in step 206 to see if "tc" has reached the end of the trace. If "tc" has reached the end of the trace, it means that the current subcycle is cut off by the end of the trace. In the case where the end of the trace has been reached, "td" is set to the beginning of this subcycle in step 208, and parseMASTER returns with the count from index to "td". ParseMaster handles a cut off subcycle in this manner so that the next iteration of ParseTrace will pick up the cut off subcycle in its cutend statistic.

In the normal case, "tc" will not be at the end of the trace. The loop then sets "td" to the end of the current subcycle in step 210. This is done by setting "td" equal to "tc", and then running forward in steps 212, 214, 216 through the trace until either the DAK signal deasserts, indicating the end of the master cycle, or any of the IOR, IOW, MRD, or MWR signals are found asserted, indicating another master mode subcycle begins after this one.

Once "td" is set, a check is done in step 218 to see if "td" has not hit the end of the trace, and in step 220 that the DAK signal is still asserted at "td". If either "td" has hit the end of the trace, or the DAK signal is not asserted, it indicates in step 222 that the current subcycle is the last subcycle in this master cycle, and the current subcycle is from "ta" to "td". If "td" is not at the end of the trace, and DAK is still asserted, it indicates in step 224 that there is another subcycle after this one, and the current subcycle is from "ta" to "tc".

If the current subcycle is the last subcycle, procedure parseMasterCycle (FIG. 19g) is called in step 222 with "ta", "tb", and "td". Then the parseMASTER procedure exits. On exit, if "td" is equal to "start" in step 226, it indicates that no cycles could be parsed, and parseMASTER returns in step 228 with 0. If "td" does not equal "start", it returns in step 230 with "td"—"index", which is the count from index to the end of the master cycle.

If the current subcycle is not the last subcycle, procedure parseMasterCycle (FIG. 19g) is called in step 224 with "ta", "tb", and "tc" to parse the current subcycle. Then "ta" is set equal to "tc", and "tb" is set equal to "td" in step 232. This sets "ta" to the beginning of the next subcycle, and "tb" to the beginning of the assertion of the IOW, IOR, MRD, or MWR signal in the next subcycle. Then the procedure goes back to the beginning of the loop to process the next subcycle.

Figure 19G:
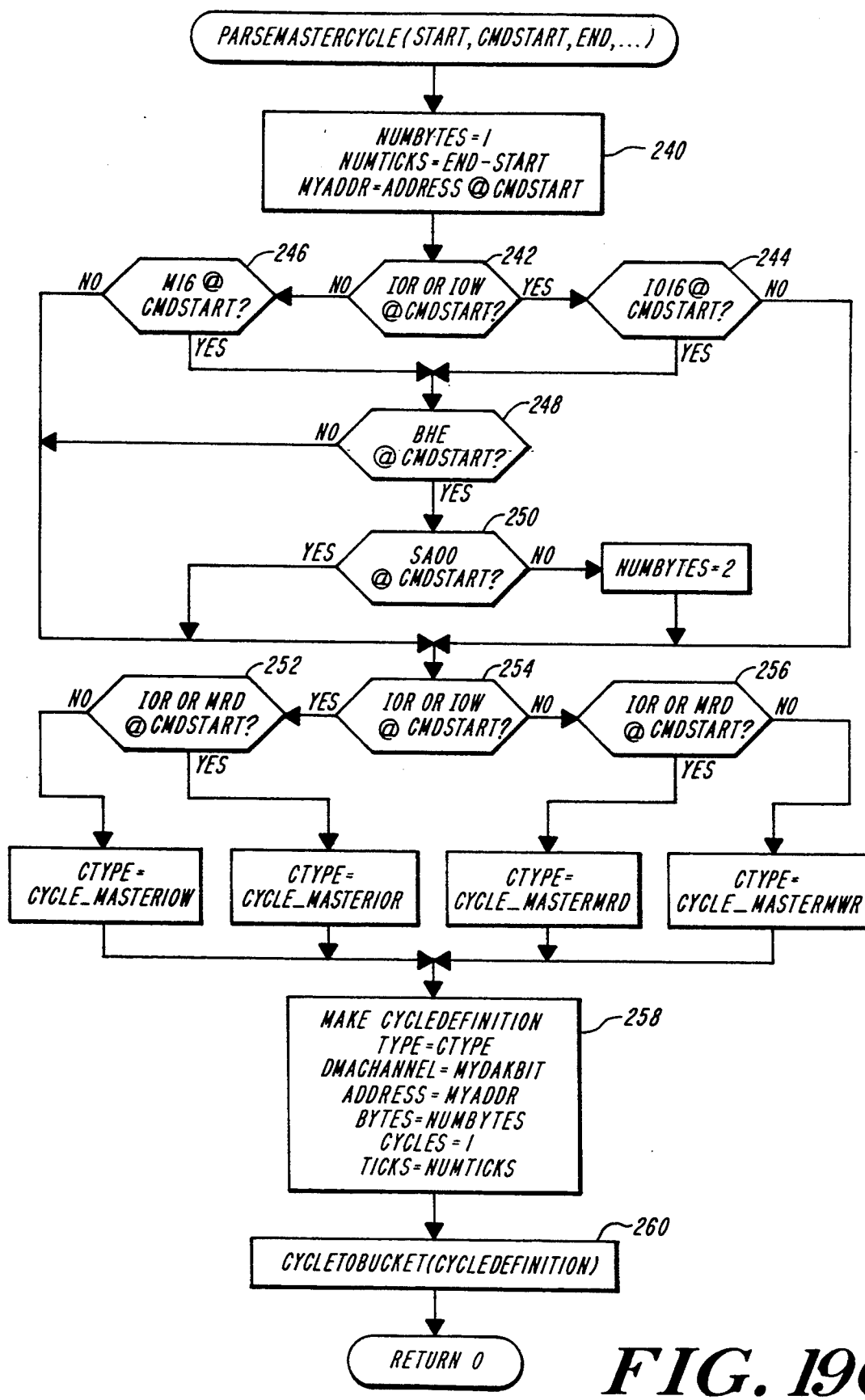
Figure 19H:
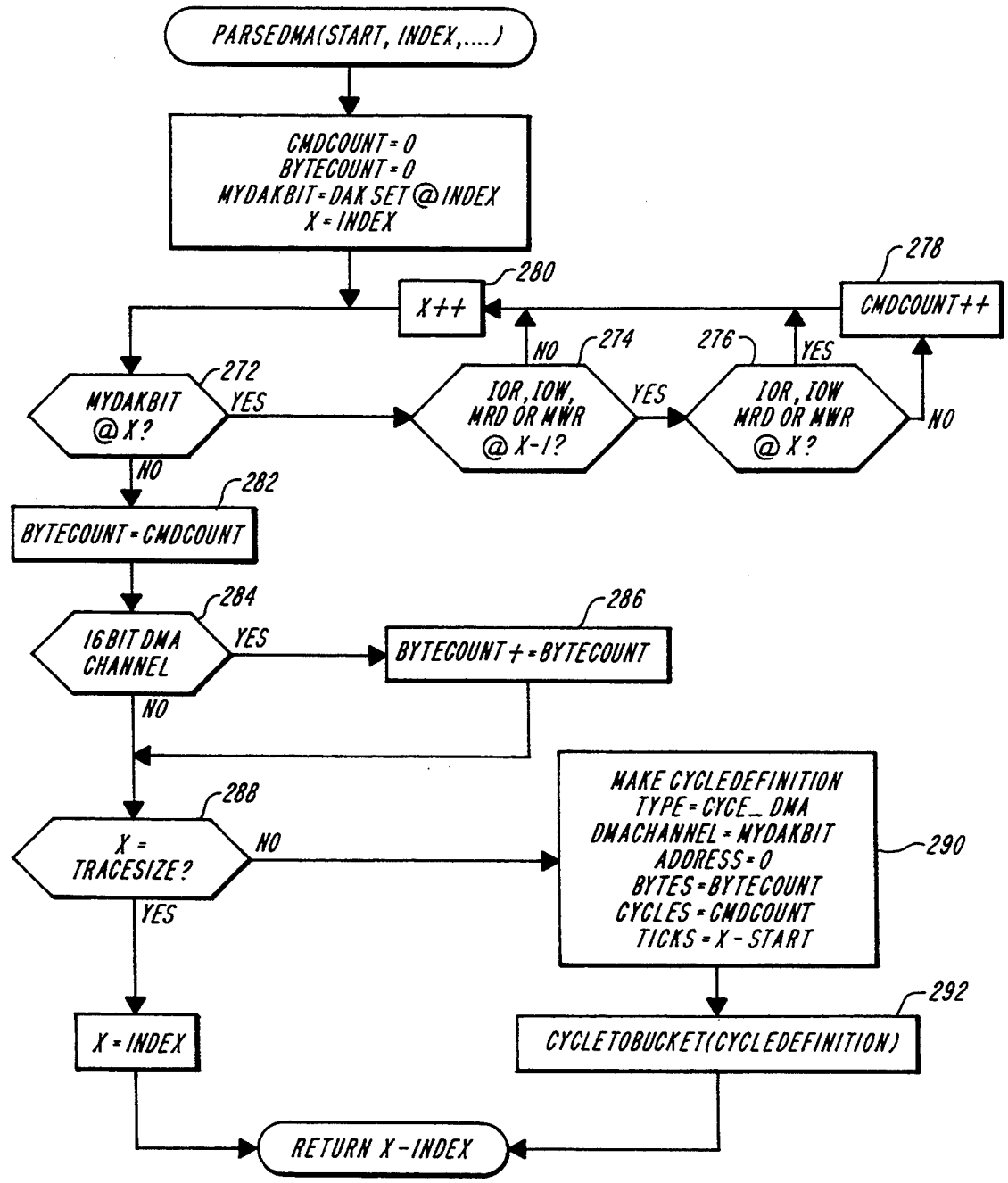
Figure 19J:
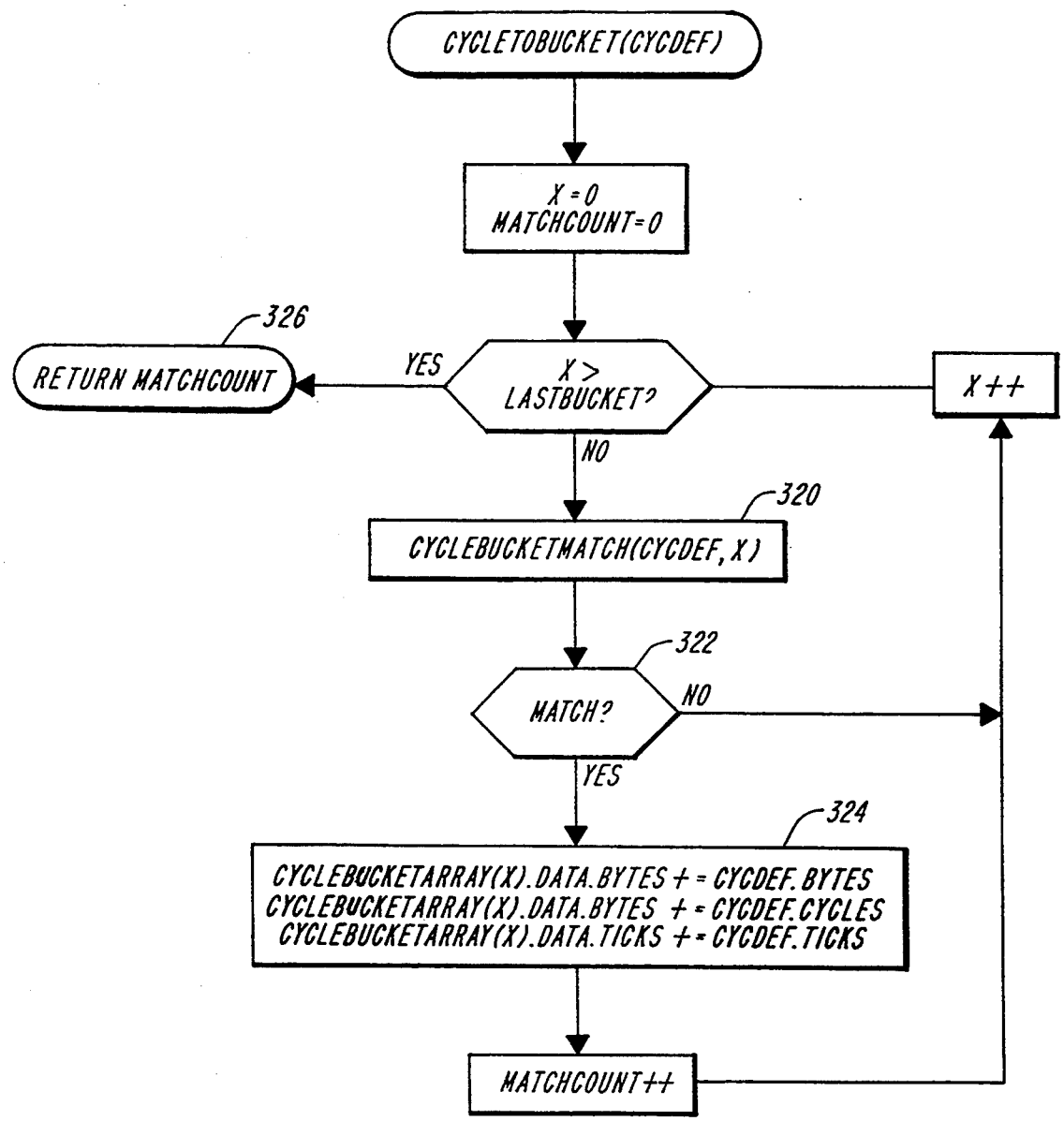

FIG. 19g shows procedure parseMasterCycler which is used to parse master mode subcycles. ParseMasterCycle is passed the start of the subcycle in "start", the beginning of the assertion of the IOR, IOW, MRD, or MWR signal in "cmdStart", and the end of the cycle in "end". ParseMasterCycle begins in step 240 by calculating the length of the subcycle by subtracting "start" for "end". Then it determines the address used for the subcycle by sampling the address signals at "cmdStart".

Then parseMasterCycle determines the number of bytes transferred in the subcycle. Signals IOW and IOR are sampled at "cmdStart" in step 242. If either are asserted, the subcycle is an IO cycle, and signal IO16 is tested at "cmdStart" at step 244. If neither are asserted, the subcycle is a memory cycle, and signal M16 is tested at "cmdStart" in step 246. If either M16 for a memory cycle, or IO16 for an IO cycle is sampled asserted, it indicates that the subcycle could have transferred 2 bytes. If neither are asserted, the subcycle only transferred 1 byte.

If the subcycle could have transferred 2 bytes, signals BHE and SA00 are sampled at cmdStart in steps 248, 250. If BHE is asserted, and SA00 is not asserted, the subcycle transferred 2 bytes of data. If either BHE is not asserted, or SA00 is asserted, then only 1 byte was transferred for the cycle. After the number of bytes transferred is determined, the cycle type is determined in steps 252, 254, 256 by checking which of IOR, IOW, MRD, or MWR is asserted at "cmdStart". A CycleDefinition object is then made in step 258 with the information, and CycleToBucket is called in step 260 to update any pertinent statistics for this subcycle. ParseMasterCycle then returns.

FIG. 19h shows the parseDMA procedure. It begins in step 270 by determining which DAK signal is asserted, which indicates which DMA channel is performing the cycle. Then it enters a loop that counts how many subcycles occurred in the DMA cycle. The loop runs through the DMA cycle in steps 272, 274, 276, 278, 280 counting the number of times the current trace sample does not have signal IOR, IOW, MRD, or MWR set, where the previous sample did.

Once the count is compiled, it is used in step 282 as the number of bytes transferred by this DMA cycle. Then a test is performed in step 284 to see if the DMA channel for this cycle is a 16 bit DMA channel. If it is, the byte count is doubled in step 286, since 16 bit DMA channels transfer 2 bytes on each subcycle.

Then a check is performed in step 288 to see if the DMA cycle was cut off by the end of the trace. If it was, parseDMA returns with a value of 0. If it was not cut off, a CycleDefinition object is made in step 290 with the information about the cycle, and CycleToBucket is called in step 292. Then parseDMA returns with the count of samples from index to the end of the DMA cycle.

FIG. 19i shows the procedures skipIdles, findIdle, and findCmd. SkipIdles is called to find the next trace sample that is not a sample of an idle bus. It returns with the number of samples between the current index and the first non-idle sample. FindIdle is used to find the next trace sample that is of an idle bus. It returns with the number of samples between the current index and the first sample of an idle bus.

FindCmd is the procedure called to determine if a cycle is parsable. It runs forward in steps 302, 304, 306 from the index through the trace until 1 of 2 events is encountered, any of bus signals IOR, IOW, MRD, or MWR are sampled asserted, or an idle bus is encountered. If the end of the trace buffer is reached before either of these events, findCmd returns with a 0 in step 310. If the end of the trace buffer was not reached, findCmd checks if it stopped at a sample of an idle bus in step 312. If it did, it returns 0 in step 310. If it did not, it returns the number of cycles counted from index until it reaches the sample with any of IOR, IOW, MRD or MWR signals asserted in step 314.

The SBM's data interpretation occurs in layers, as shown in FIG. 7. At the lowest level exists the raw bus signals. The SBM hardware captures these signals into trace samples. These trace samples are then parsed into cycles. The cycles are then used to generate statistics that are kept in statistics gathering objects called buckets. These buckets are then grouped together to gather all the statistics for a particular bus object. A bus object is typically a circuit board that is connected to the bus. The information about the bus objects is then archived to storage to maintain a history of activity on the bus. This history is then displayed to the user via graphs or other suitable means.

A bucket object contains a cycle type, a dma channel, a low address, and a high address. These parameters allow the bucket to define what group of cycles it is interested in. The bucket also contains the parameters "Bytes", "Cycles", and "Ticks". When a cycle object is found to match a bucket object, that bucket's parameters are incremented by the amounts for the cycle represented by the cycle object. "Bytes" is incremented by the number of bytes transferred for that cycle, "Cycles" by the number of cycles or subcycles that were contained in that cycle, and "Ticks" by the number of trace samples, or ticks, that the cycle spans.

Buckets are defined by the display station. A user enters descriptions of the bus objects that are connected to the bus. The display station takes these descriptions, and decides what groups of cycles need to be monitored in order to gather statistics on the bus activity for those bus objects. The display station then defines a list of bucket objects that define the groups of cycles for which statistics are to be gathered. This list of buckets is downloaded to the SBM board, where the buckets are placed into an array called the CycleBucketArray.

Figure 19K:
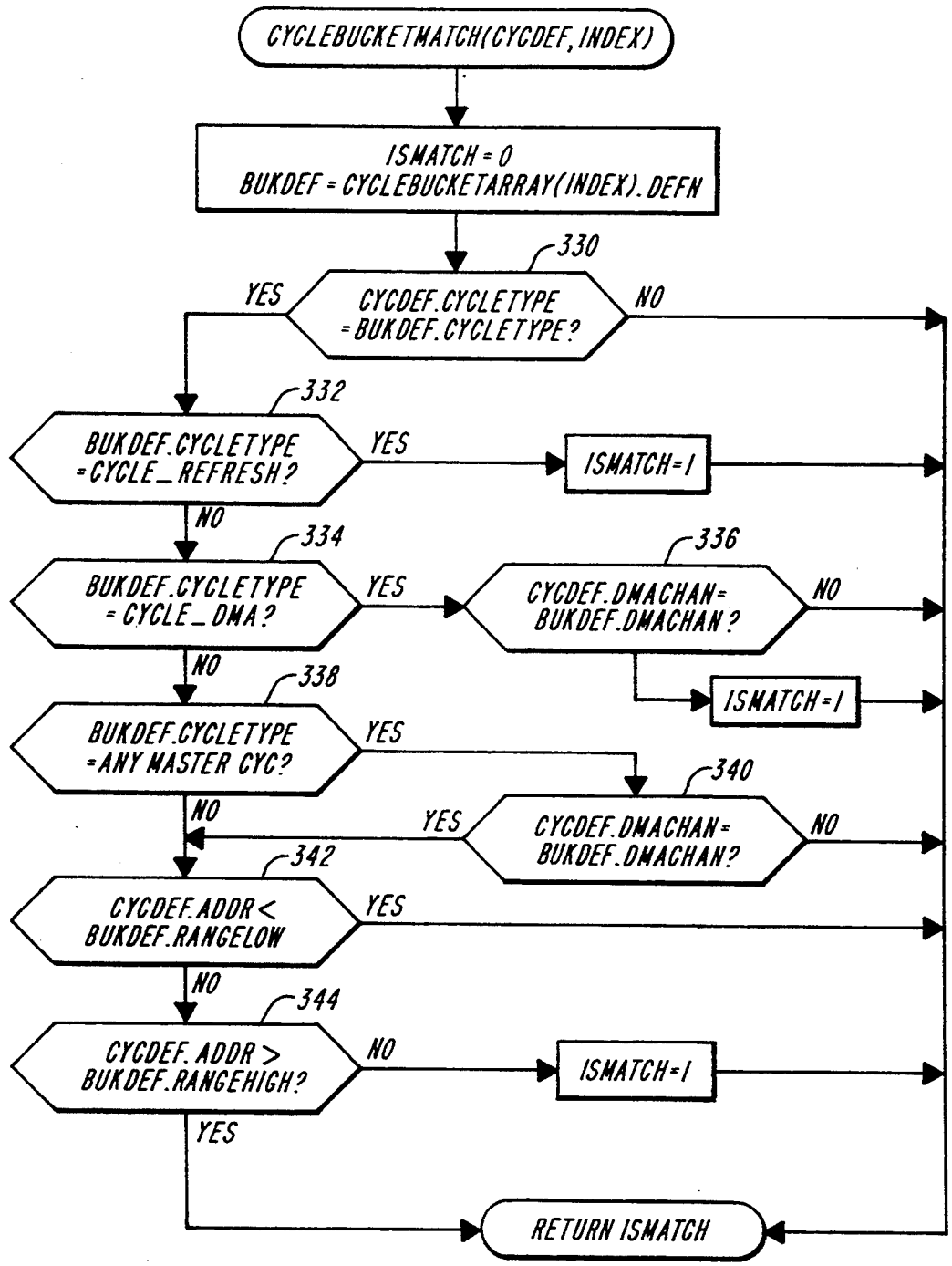

FIGS. 19j and 19k show how CycleDefinition objects created by PARSETRACE are used to search the CycleBucketArray, and update the statistics of matching buckets. When a cycle is parsed out of the trace memory, a CycleDefinitionObject is created. This CycleDefinitionObject is then passed in a call to procedure CycleToBucket, which determines if any buckets match this cycle, and updates their buckets if they do.

CycleToBucket is shown in FIG. 19j. It is called with parameter "CycDef", a CycleDefinitionObject. CycleToBucket iterates through all the CycleBuckets contained in CycleBucketArray, calling CycleBucketMatch in step 320 to determine whether each entry matches "CycDef". If a match is found in step 322, then the "Bytes", "Cycles" and "Ticks" parameters for that CycleBucket are incremented in step 324 with the corresponding values in "CycDef". CycleToBucket returns with the number of matches found in step 326. It will be 0 if no matches were found.

CycleBucketMatch is shown in FIG. 19k. It is called with "CycDef", the CycleDefinitionObject, and "index", which states which bucket in the CycleBucketArray to compare "CycDef" against. CycleBucketMatch first compares the cycle type of the bucket to the type in "CycDef" in step 330. If they do not match, it immediately returns stating there is no match. If they do match, it then checks what type of cycle "CycDef" is, and performs the proper comparisons for that cycle type.

If the cycle type is refresh in step 332, it immediately returns with a match, because no parameters are used to distinguish refresh cycles. If the cycle type is not refresh, it is checked to see if it is a DMA cycle in step 334. If it is, a match is determined in step 336 by whether or not the bucket has the same DMA channel specified as "CycDef". If they are the same, it is a match.

If the cycle type is not DMA, then it is checked for being a Master cycle in step 338. If it is, the DMA channels are again compared in step 340 to see if the bucket is set to the same DMA channel as "CycDef". If they are not the same, CycleBucketMatch returns with no match.

If the cycle type is not a master cycle, or it is a master cycle and the DMA channels match, the address of "CycDef" is checked in steps 342, 344 to see if it is within the range specified by the bucket's high and low address parameters. If "CycDef" has an address that falls between these ranges, CycleBucketMatch returns saying there is a match. If it does not, there is no match.

The end result of this algorithm is that refresh cycles always match, DMA cycles must have the same DMA channel to match, standard cycles must have the same address, and master cycles must have the same DMA channel, and address.

The Display System

A. User Interface

The Station provides a user interface display for soliciting the user's requests for statistical information and for displaying the requested information.

Figure 8:
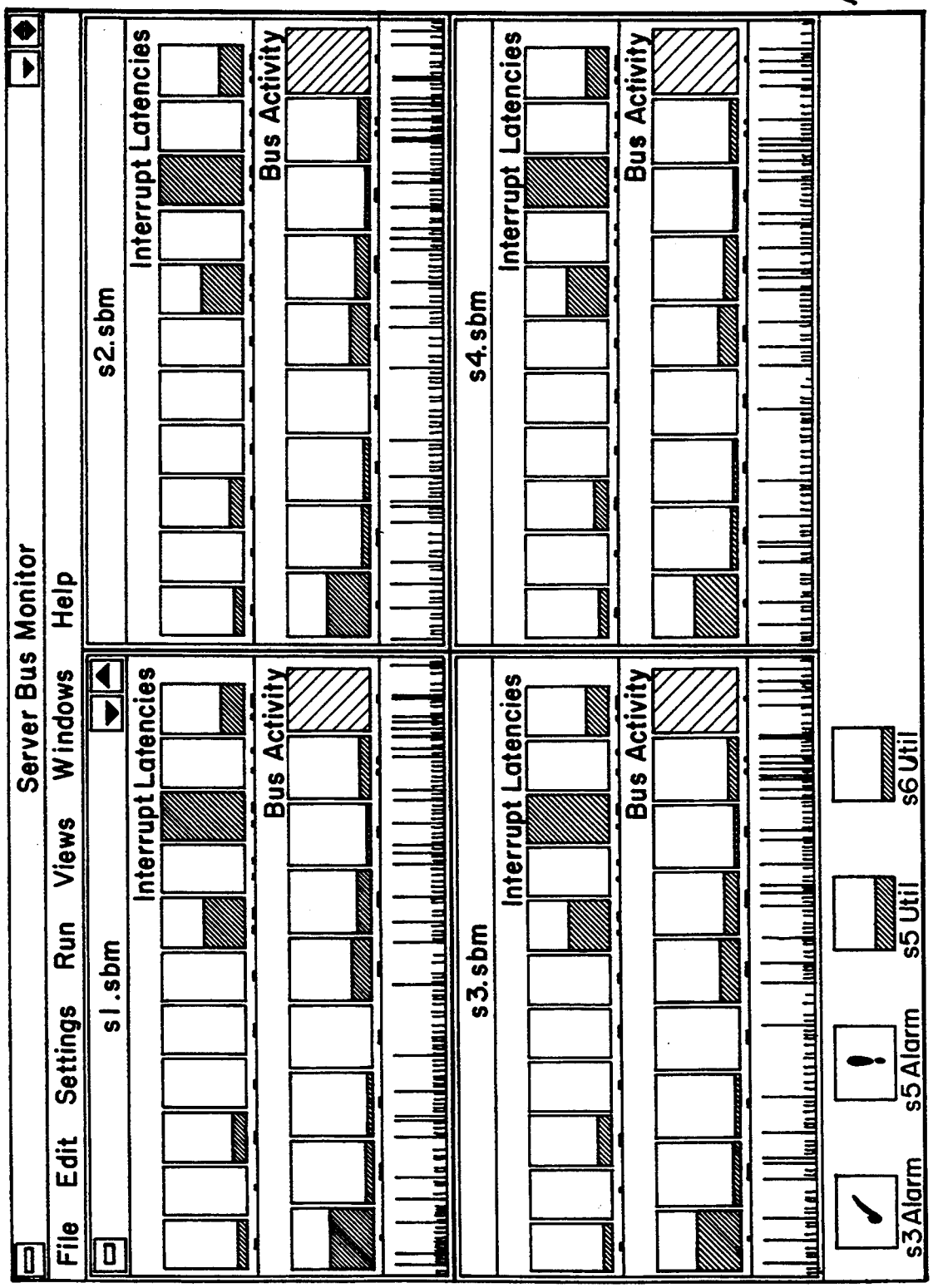
FIG. 8 is a view of a Multiple Document Interface (MDI).

Referring to FIG. 8, the user interface includes a Multiple Document Interface (MDI) which presents the user with several documents, each of which provides a different view into the SBM and its data. Configuration and Control is accomplished via the controls File, Edit, Settings, Run, Views and Windows at the top of the MDI document. The controls always refer to the MDI document that is currently selected. The MDI documents displays can show graphical information about the SBMs, as is shown in the displays s1.sbm through s4.sbm. Information can also be shown in reduced icons, as in the case of s5 Util, and s6 Util. Conditions in which automatic notification of the user can also be displayed in alarms, such as s3 Alarm and s5 Alarm.

The Alarm Document allows the user to define the alarm conditions. If these conditions are met, an alarm is triggered causing the Alarm Document to be promoted to a display window at the front of the display. The Alarm Document includes a description of the alarm condition, thereby notifying the user of the condition.

Alarms can be defined and generated at the Cycles, Buckets, Bus Objects, and Storage/History translation layers. At the Cycles layer, an alarm could be set for 'Aborted' cycle types to notice malfunctioning bus objects. At the Buckets layer, an alarm could be set for utilization (i.e. 100% minus idle cycles) above a user-defined percentage. At the Bus Objects layer, an alarm could be set for a bus object's use of the bus above a user-defined percentage. At the Storage/History layer, an alarm could be set for usage of the bus that deviated from past usage by a user-defined percentage.

Figure 9A:
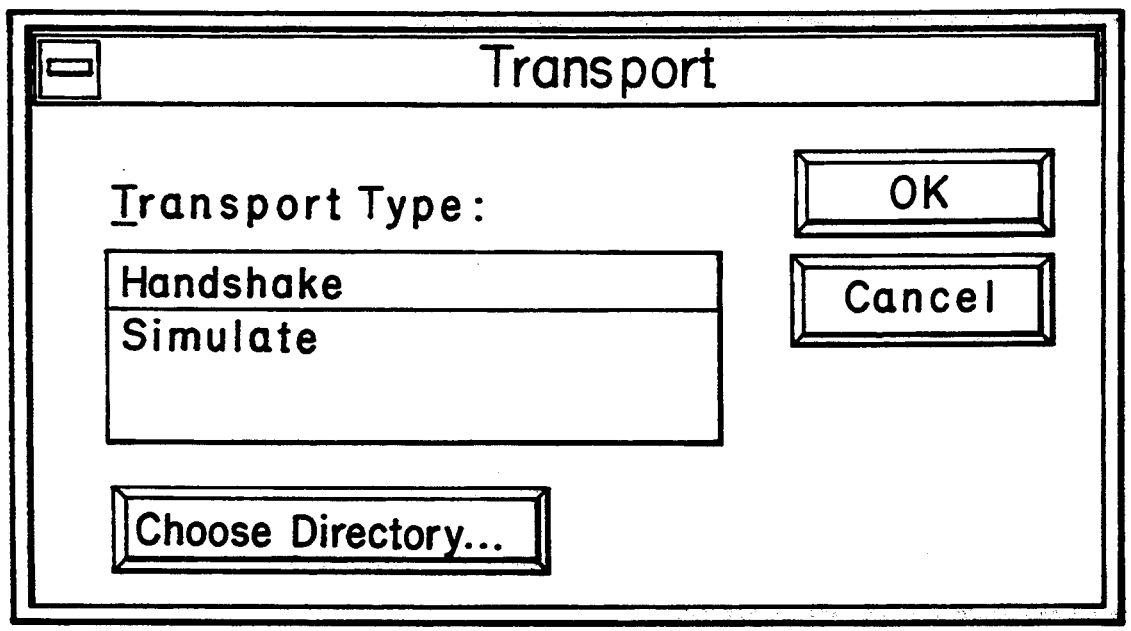
FIGS. 9A–9G are views of command menus for configuring control settings of the bus monitor of the present invention.

The settings dialog box contains the following commands used for configuring SBM software settings:
Transport
Server Name
Polling Rate
Store Data
Compression
Interrupts
Bus Objects The Transport command menu (FIG. 9A) is used to select the transport mechanism to be used for displaying data at the display station. "Handshake" allows the user to specify a directory pathname to where the SBM board data is stored in the display program. "Simulate" causes simulated SBM board data to be displayed by the display program.

Figure 9B:
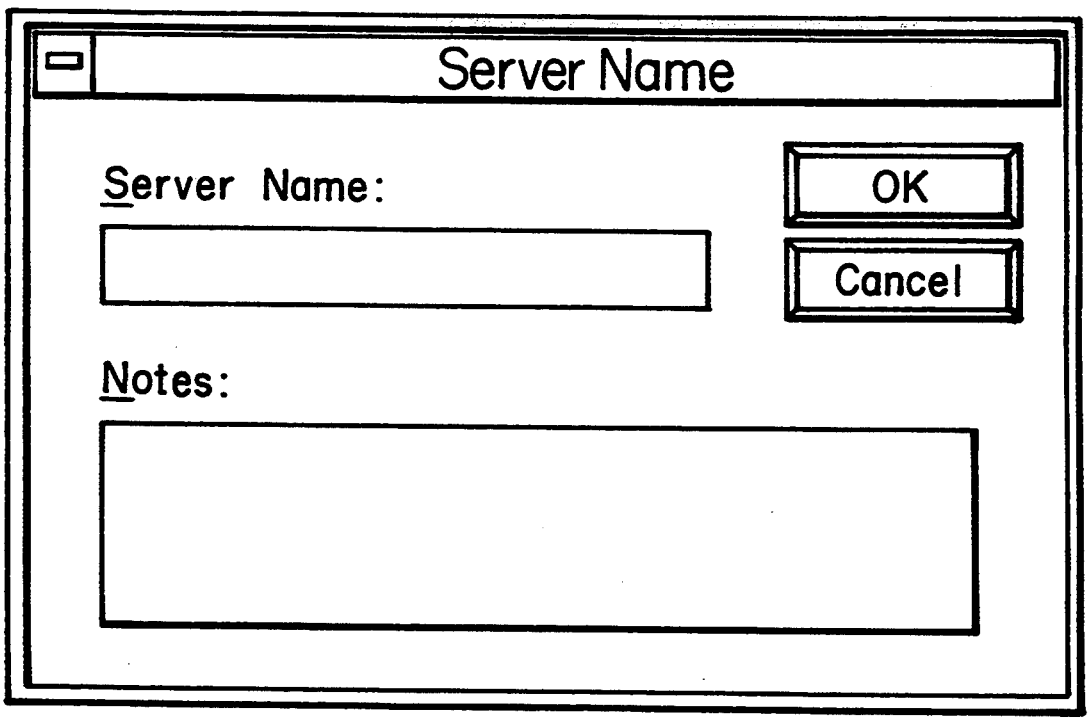

The Server Name command menu (FIG. 9B) is used to assign a name to the server the SBM board is plugged into.

Figure 9C:
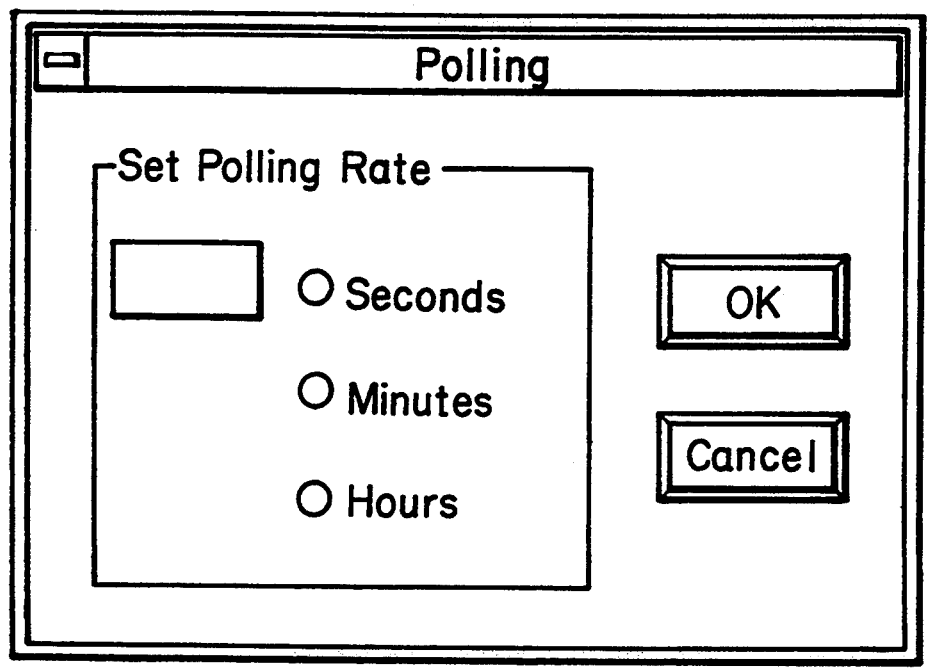

The Polling rate command menu (FIG. 9C) is used to specify how often the display station extracts data, such as interrupt latency and bus activity information, from the SBM board for analysis and display. The polling rate can be specified in seconds, minutes, or hours. For example, if the polling rate is set to ten minutes, the display station software would extract, analyze, and display the data from the SBM board every 10 minutes. The number of actual bus samples contained in that 10 minutes of card activity is specified using the compression command (see below).

Figure 9D:
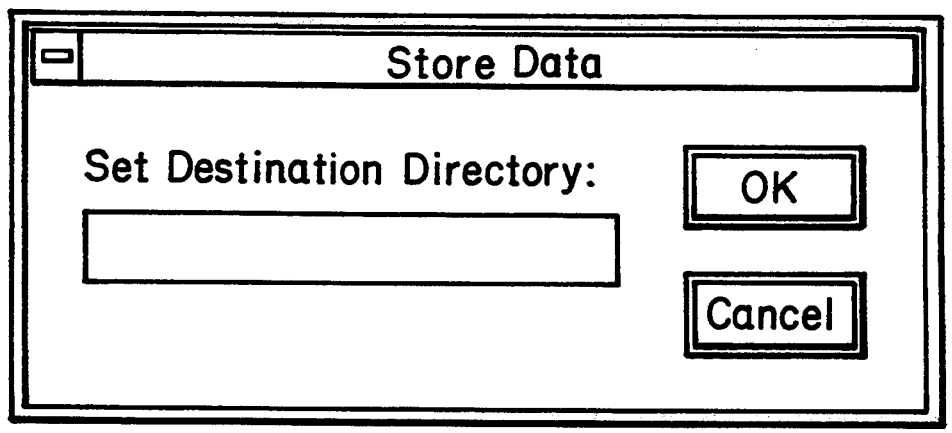

The Store Data command menu (FIG. 9D) is used to specify the directory to use as a bus activity history archive to store information from the SBM board for analysis at a later date.

Figure 9E:
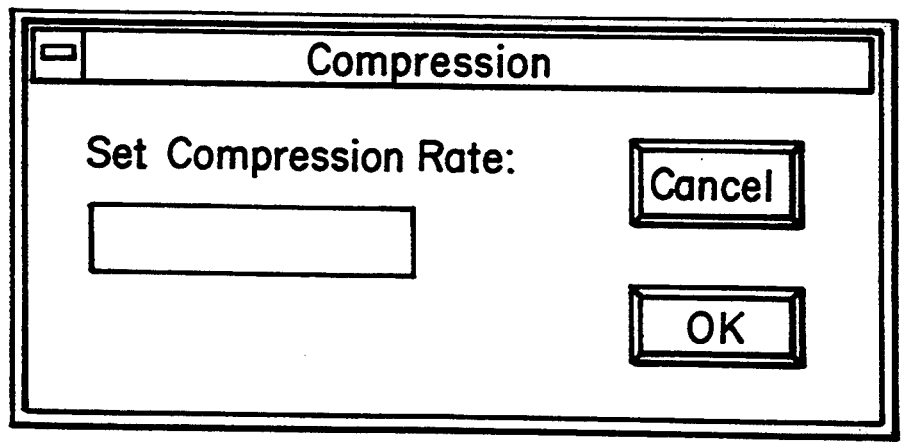

The Compression command menu (FIG. 9E) is used to specify the number of bus activity samples contained in each polling rate sample displayed by the display station.

Figure 9F:
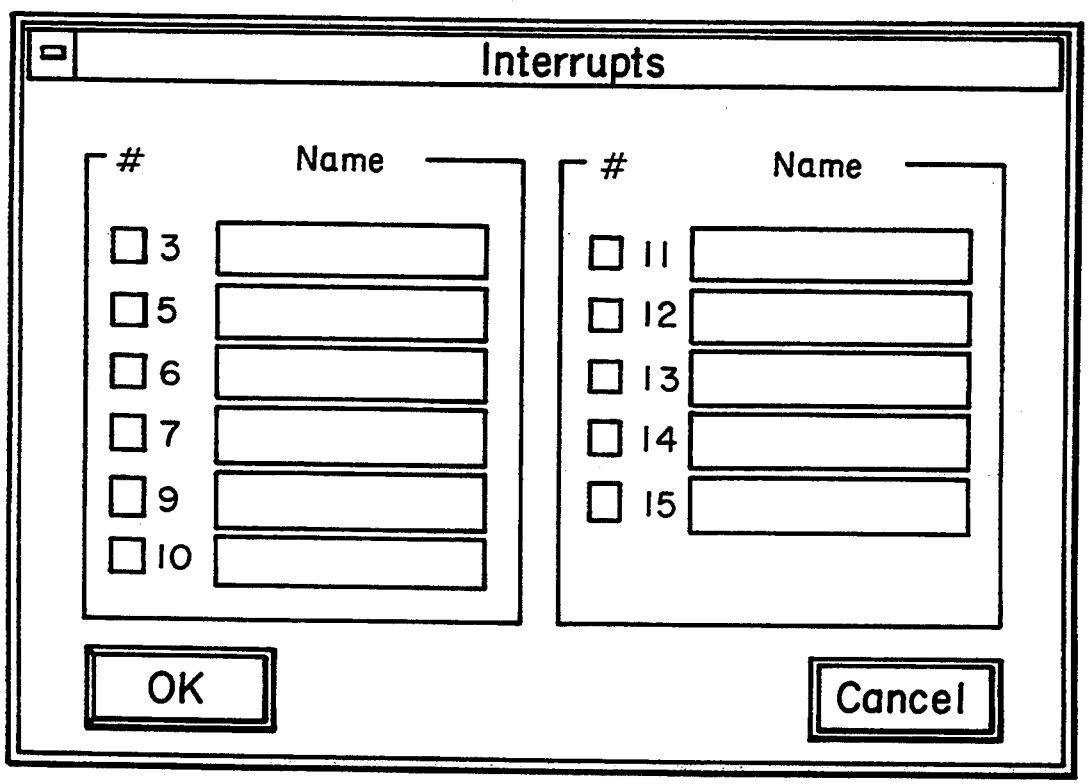

The Interrupt command menu (FIG. 9F) is used to name interrupt lines on the bus. Interrupt names are defined for each PC board plugged into the bus backplane.

Figure 9G:
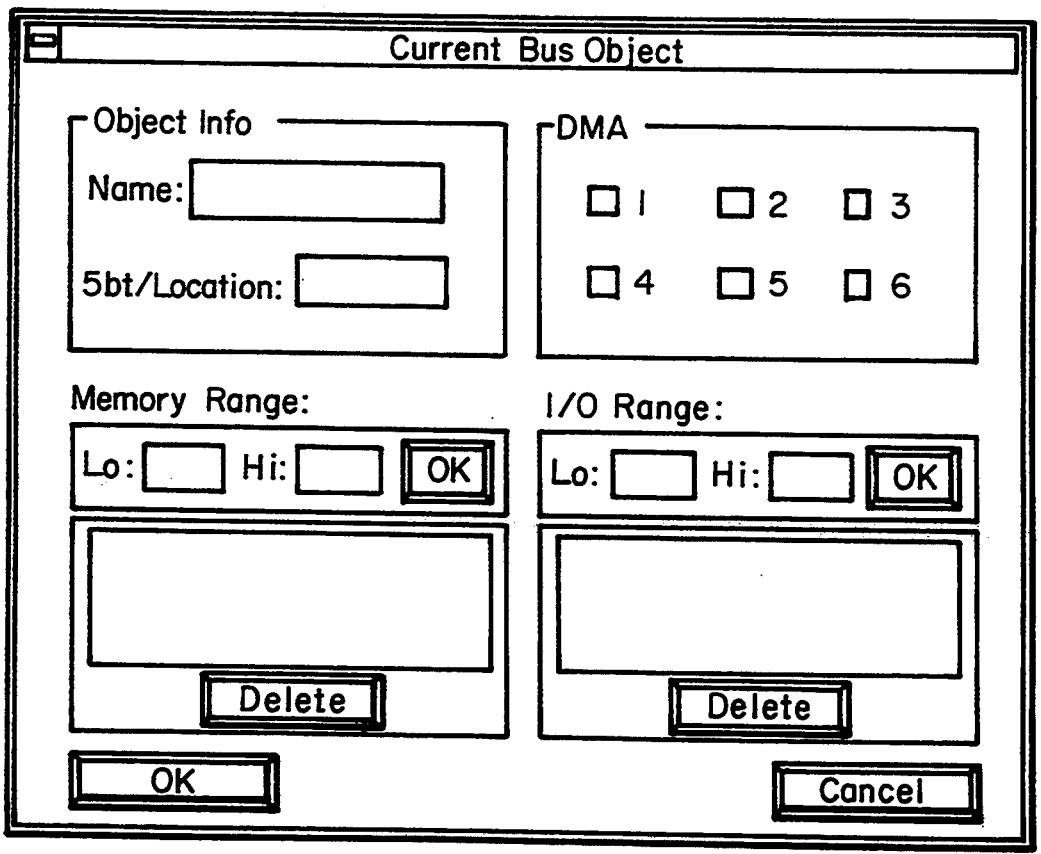

The Current Bus Object command menu (FIG. 9G) is used to define the configuration information of each bus object, such as a PC board plugged into the bus backplane (the SBM board itself does not need to be defined). Each bus object will have a name and may be associated with a backplane slot number, I/O address, memory address, and DMA channel number if applicable.

Figure 10:
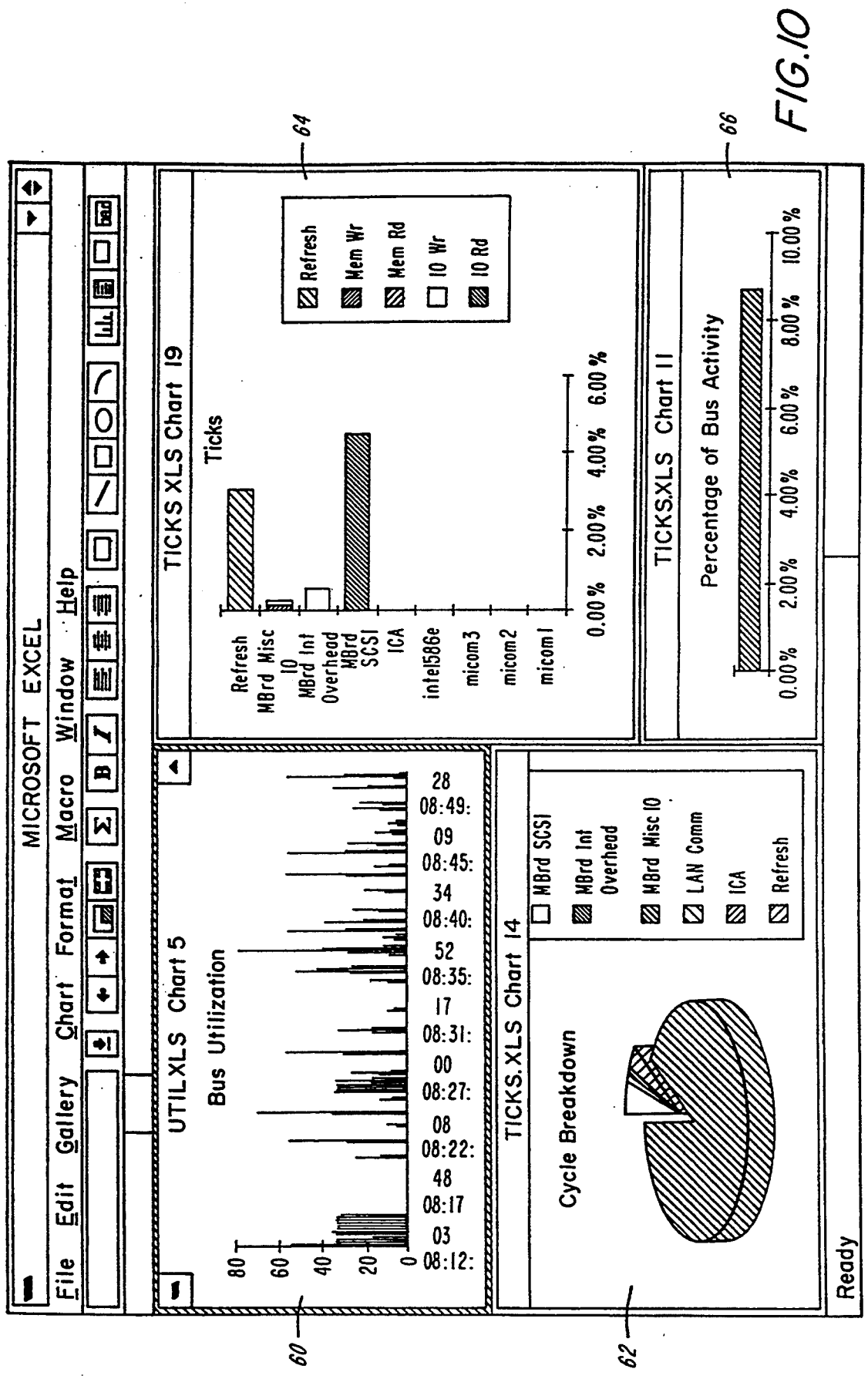
FIG. 10 is a diagram of an Excel display screen showing both graphs and menus.

FIG. 10 illustrates an example of the Microsoft Excel Display for the SBM. The Excel default display contains four documents: a Bus Utilization chart 60; a Cycle Breakdown chart 62; a Ticks graph 64; and, a Percentage of Bus Activity graph 66.

The Bus Utilization graph 60 is a needle graph showing the percent of bus samples used by the system for each trace, going backward 500 samples. The Cycle Breakdown graph 62 is a pie chart showing the proportion of samples used by each bus object for the most recent time period (e.g. one minute). The Ticks graph 64 is a horizontal bar chart showing the number of samples used per bus object and the bus cycle type proportions used by each bus object for the most recent time period. The Percentage of Bus Activity 66 shows the overall percentage of bus usage by the system for the most recent time period.

Figure 11:
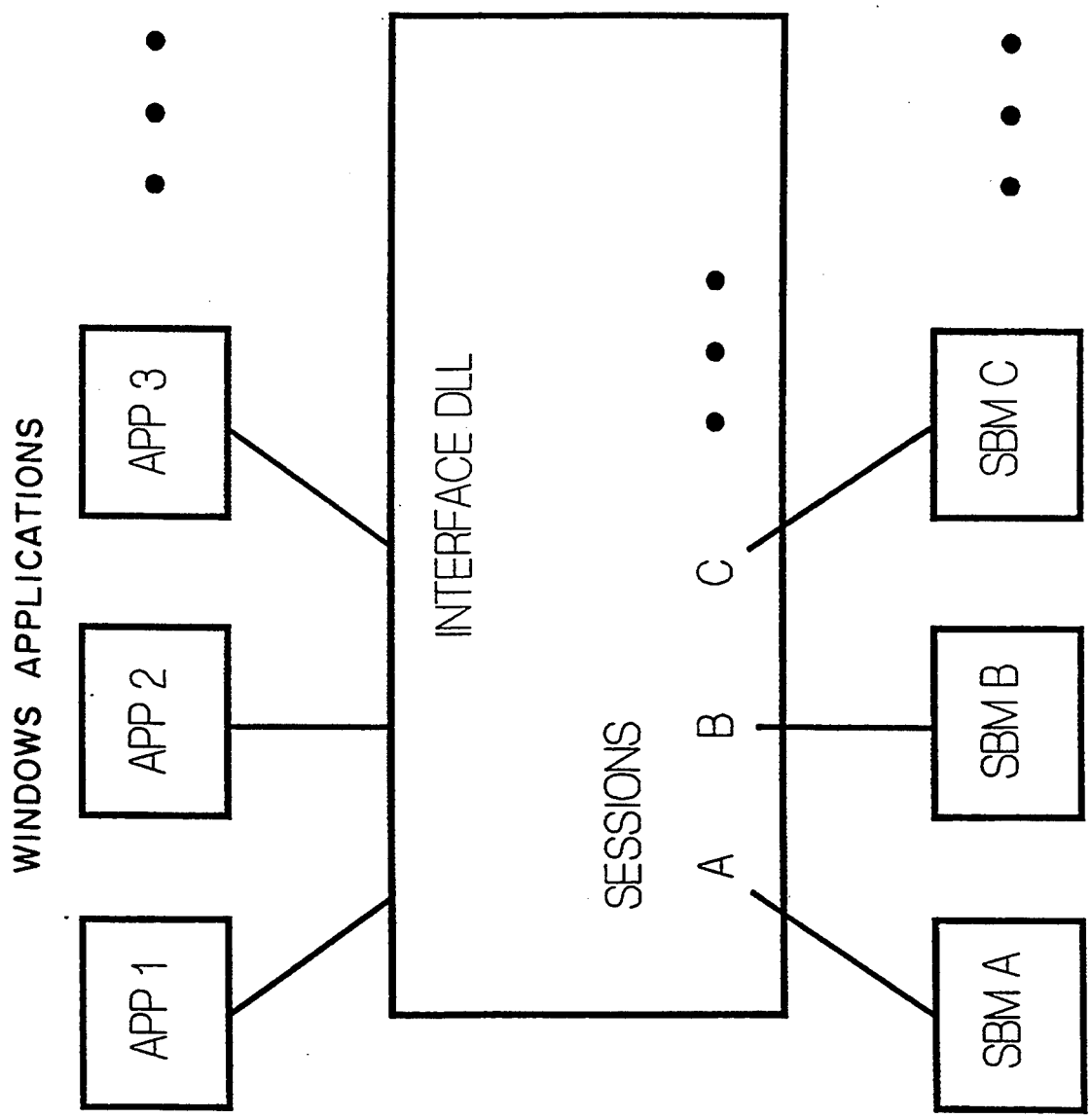
FIG. 11 is a block diagram of the relation between a Dynamic Link Library (DLL), various application programs, and a plurality of SBM circuits.

Referring to FIG. 11, a Dynamic Link Library (DLL) includes a library of code available on the Display Station for use by Microsoft Windows programs to access SBM data. When application software on the Display Station desires to interact with an SBM, it registers with the DLL. The DLL establishes a session to that SBM and passes a handle back to the application. From then on, when the application needs data from that SBM, it makes a request to the DLL using that handle. The DLL then gets the appropriate data and passes it back to the application.

The DLL periodically requests updates from the SBM so that most application requests are satisfied locally by the DLL, rather than accessing the SBM itself for the data. Also, the DLL establishes only one session per SBM. If multiple applications request sessions to the same SBM, the DLL will establish the session upon the first request, and then distribute the same handle to the subsequent requestors.

The DLL is also set up so that the function calls for the requests, and the format of the data is compatible with Microsoft Excel function calls and data formats. This allows Microsoft Excel macros to communicate with the DLL, and be able to display dynamically updated data from the SBMs.

Figure 12:
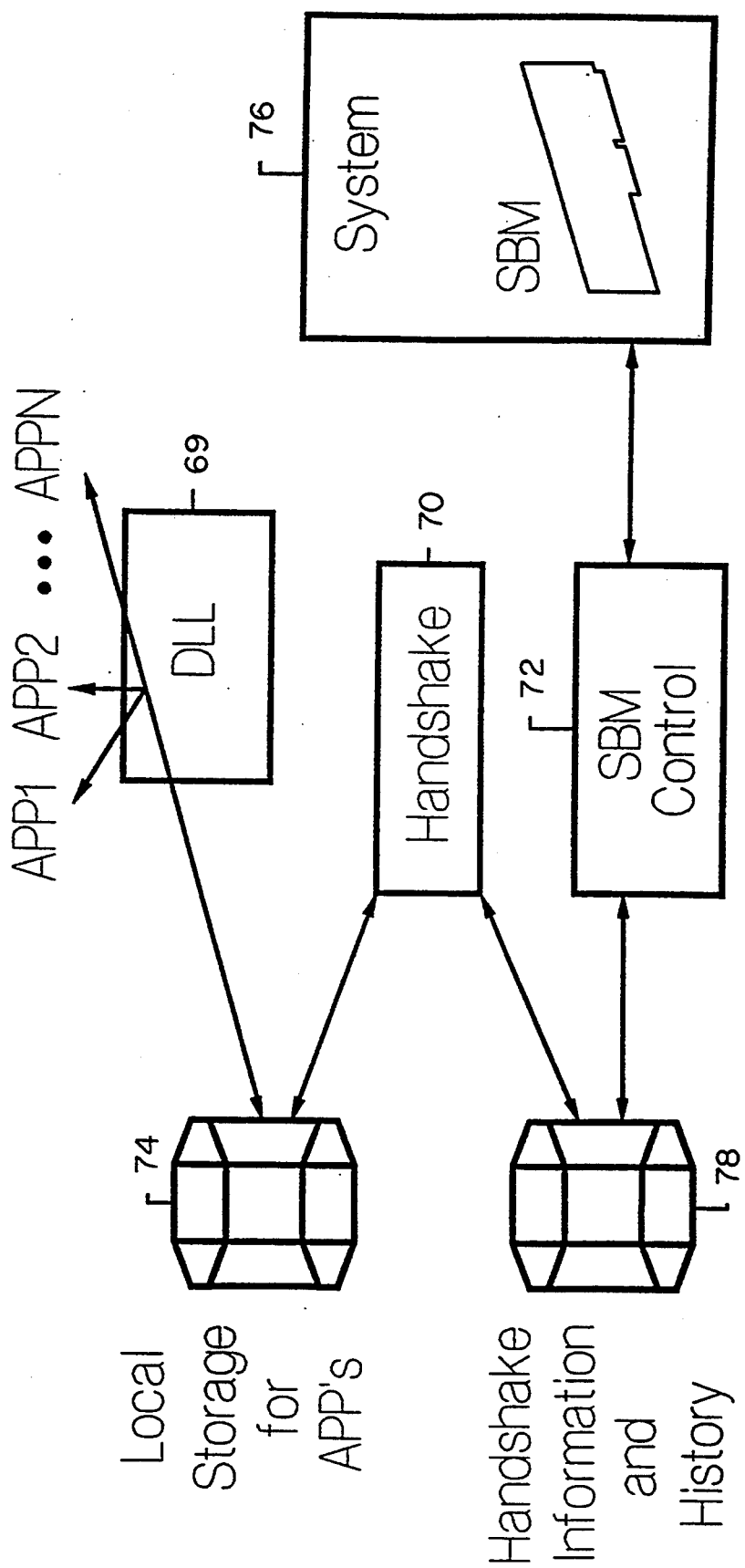
FIG. 12 is a flow chart illustrating the DLL Data Flow.

FIG. 12 show the data flow through the DLL 69. The DLL gets a periodic "wake-up call" from MS Windows, where it checks to see if it is time to perform another update. If so, the DLL requests more data for each session. It posts a request per session to a Handshake Interface 70. Each SBM is driven by its own SBM control software 72, and the Handshake passes the requests to each SBM control. When the Handshake notifies the DLL that it can access the data, the DLL copies the data to local storage 74, then tells the Handshake Interface to free up the data.

When applications make requests for data, the DLL goes to the local storage associated with that request, formats the data, and gives it to the application. If multiple applications make requests for the same SBM's data, they are all given copies of the same local data.

The data flow is from the SBM 76 to the SBM control 78, from the SBM control to the SBM control's storage 78, from the SBM control's storage to the DLL's local storage 74, and from the local storage to the application. It is also possible for the application to store its own version of some of the data.

Figure 13:
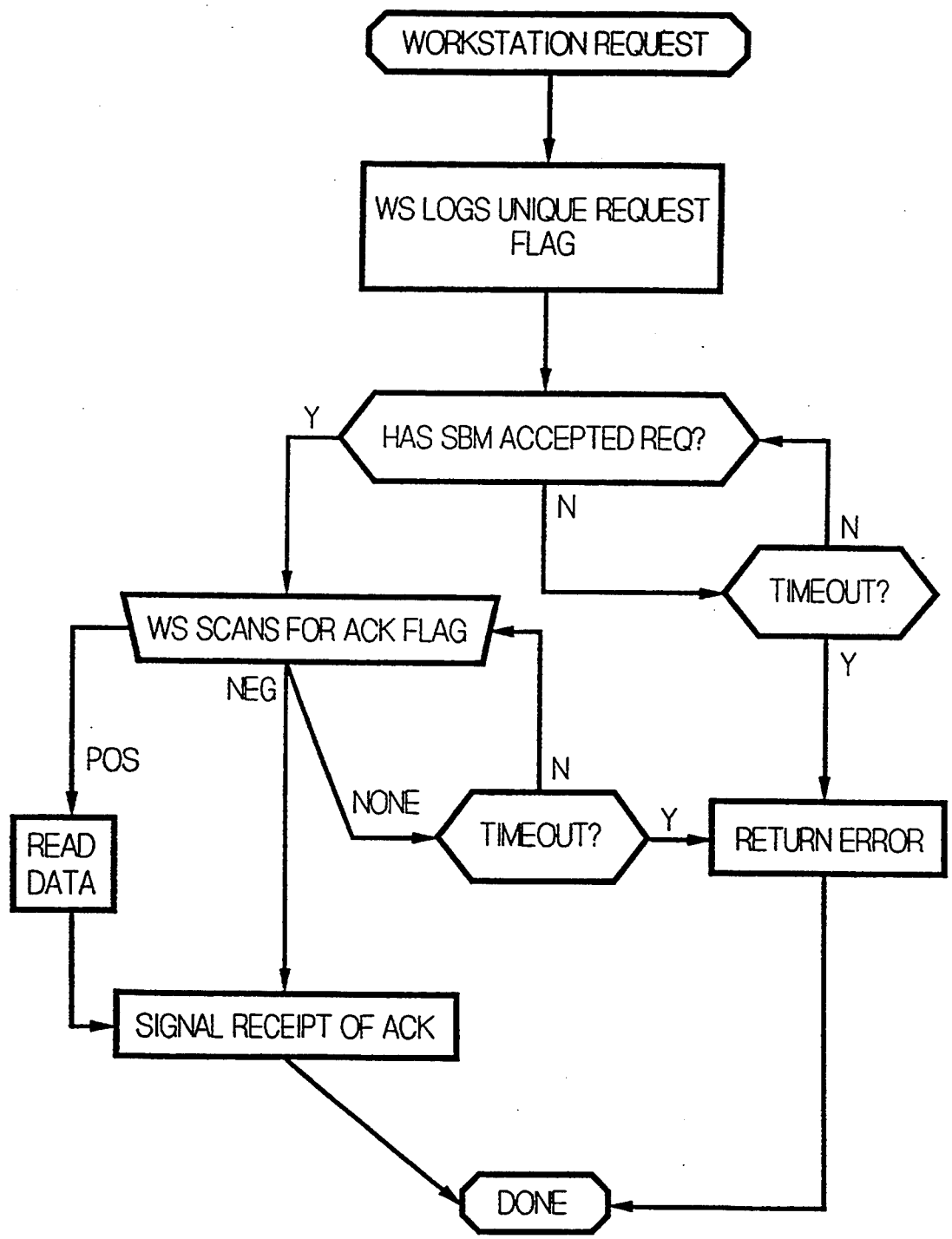
FIGS. 13 and 14 are flow charts of a Handshake mechanism.

FIG. 13 depicts the procedure for logging Display Station data requests. An application calls the routine and passes value "NN" as the requested data type. The routine returns after the request has been logged in the main directory. All directory operations are guaranteed to be atomic. An application calls with "uniqueID" requestor status. If the request code exists, then the request has not been accepted by the SBM. If the request code does not exist, then a test is performed to ascertain the existence of an acknowledgment code for there questor "uniqueID". If the acknowledgment code does not exist, then the request has not yet been processed. If the acknowledgment code does exist, then the status (positive or negative) is returned. If the acknowledgment status is positive, the data file is ready to be read. When the display station has processed the acknowledgment code and/or read the data file, the acknowledgment code in the main directory is erased.

Figure 14:
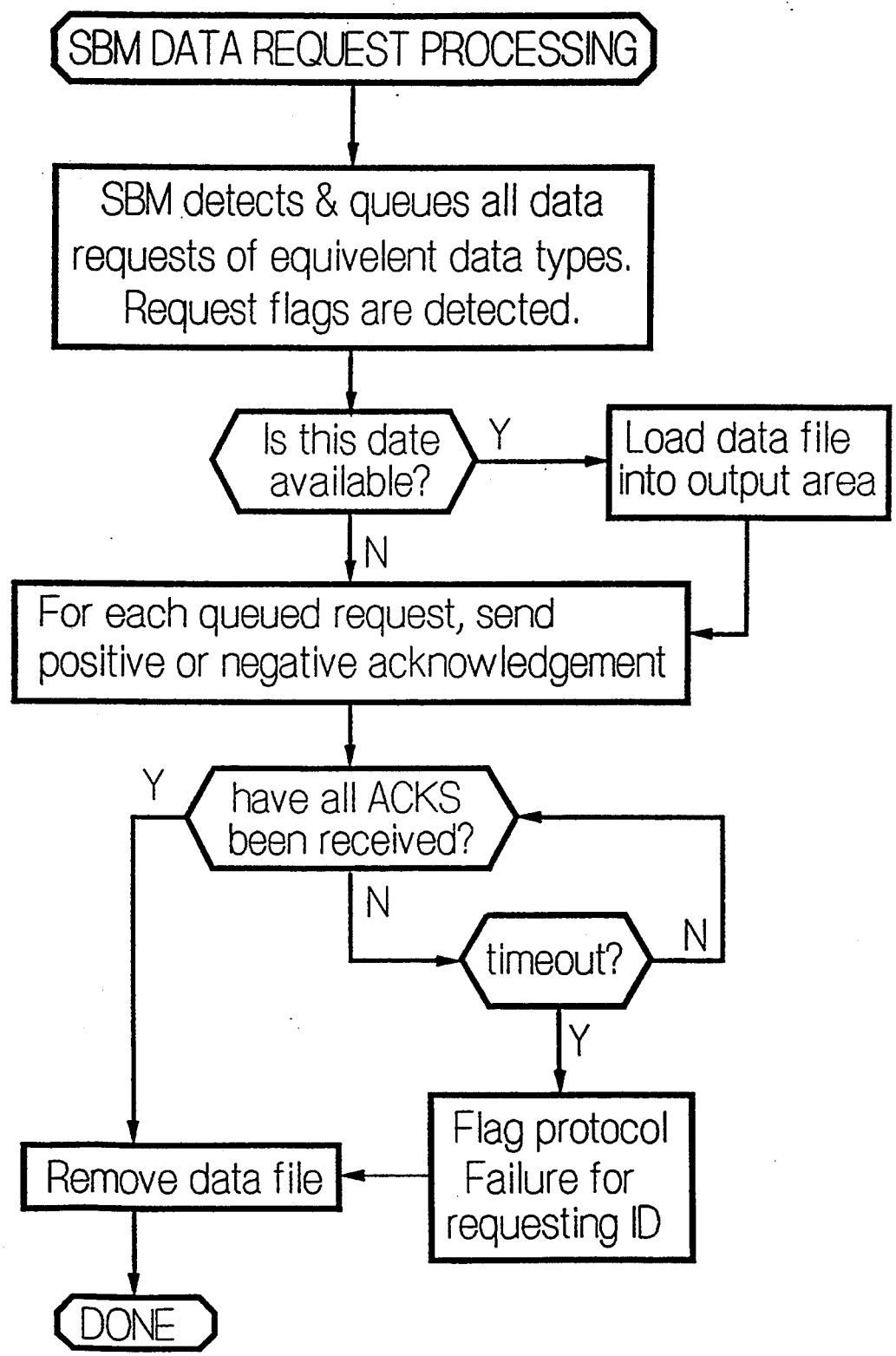

FIG. 14 illustrates the procedure to detect and log data requests. The SBM scans the main directory for the presence of request files. If one is found, then the file type being requested is decoded and saved. The request is queued in a separate area, then erased from the main directory. The main directory is scanned for the other requests which match the data type saved. If found, they are handled as above. When complete, a list of requests (or a null list) is returned, along with the data type.

An application determines whether the data request type "NN" can be processed. If yes, then the data file is loaded into an output area in preparation to be read. An acknowledgment code is then set with either a positive or negative value. For all elements in the request queue, individual acknowledgment flags are created in the main directory containing: the unique ID, the ack code, and the data type.

The main directory is scanned for pending acknowledgment files for data type "NN". If any are found, status "read incomplete" is returned. If not found, the data file is removed from the output area. "Completion" status is then returned. After an appropriate timeout. All outstanding acknowledgment flags are removed and replaced with corresponding default flags. The datafile is then removed from the output area.

FIG. 15 presents a Block Diagram of the SBM Control. A test is performed to determine whether the time delta between results updates has expired. If the time delta has expired, the analyzed trace results are stored in files as Bus Objects results. The results files are stored in results directories and later used for History. If the time delta has not expired, the procedure returns without taking any further action.

Figure 16:
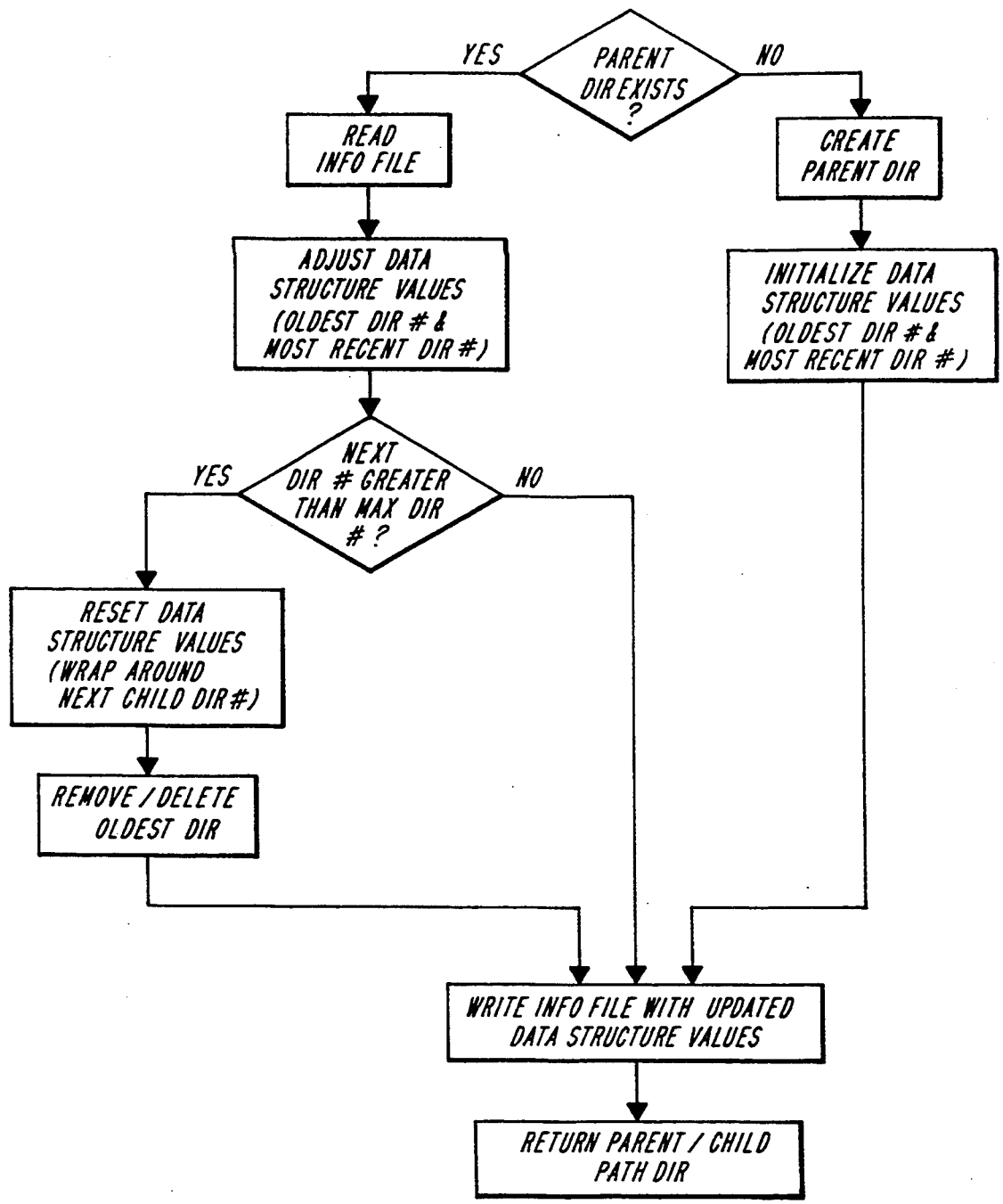
FIG. 16 is a flow chart illustrating the preparation of histograms by an SBM.

FIG. 16 describes the History directories. The scheme for storing history uses parent and children directories to order results. A call to a routine will provide the path name into which a set of results will be stored. The parent directory name will be supplied to the routine and to the store area, and its pathname will be created.

A test is performed to ascertain the existence of the supplied parent directory. If it exists, then the history will continue to be revised from the most recently updated child directory. The place marker information file is read to determine the "name" of the most recent directory, the place marker data structure is updated, and a test is performed to determine the next child directory identifier. If the parent directory does not exist, a parent directory is created and the place marker data structure is initialized. The place marker information file is written out and a storage area pathname is generated, then returned to the calling routine.

Figure 17:
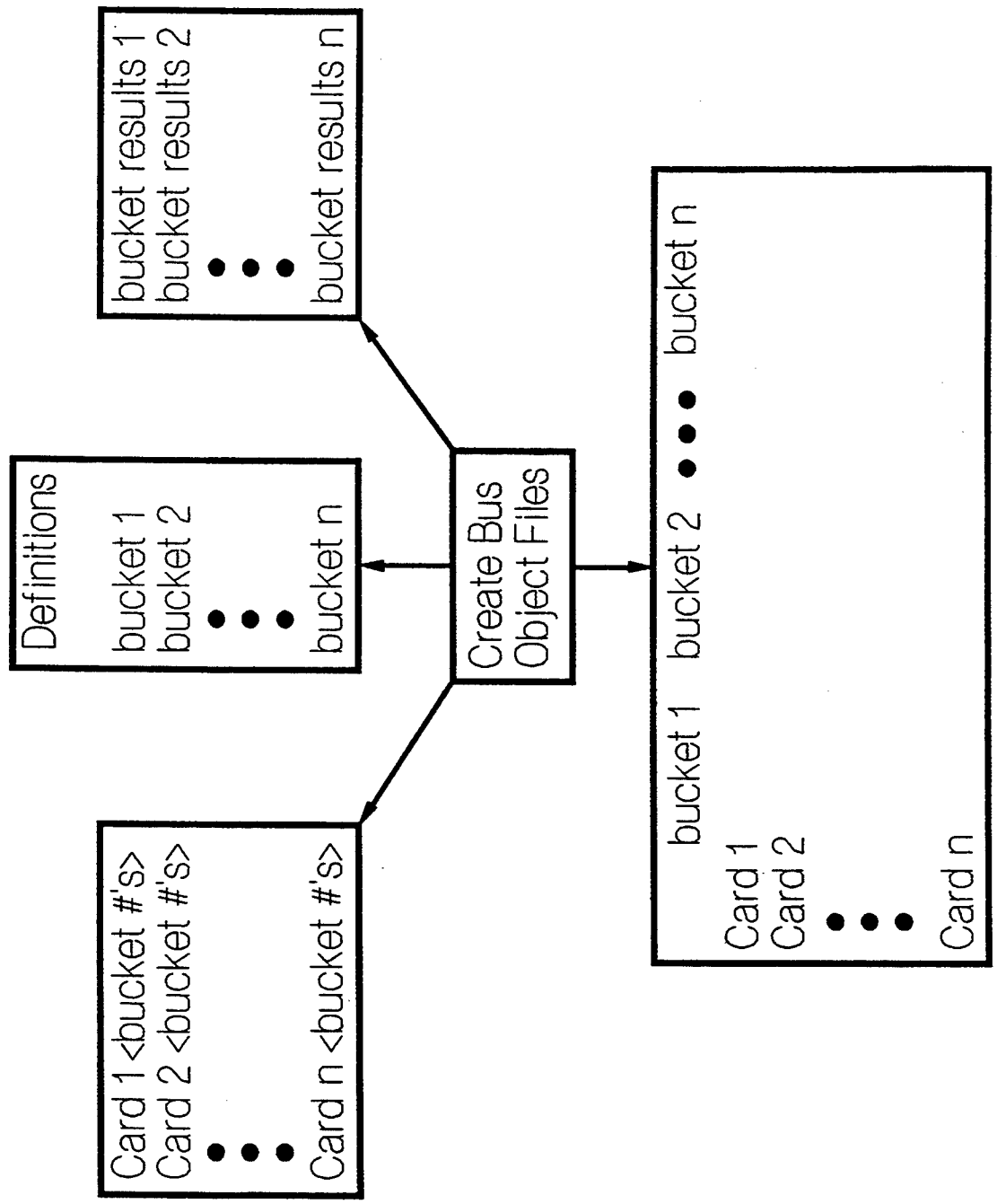
FIG. 17 is a diagram of the Bucket Results to Bus Object analysis.

FIG. 17 illustrates the Bucket Results to Bus Objects control.

A system input description file is created, the file is analyzed, and bus object definitions and bus object results data structures are generated. The contents of the input description file describe the card information used by the system (e.g. addresses, interrupts, etc.). This information is divided into specific bus object information (e.g. ISA cycle type, to some address range, or on some DMA channel). The specific bus object information is used to create the bus object definition and bus object results data structures. The bus object results data file is a Comma Separated Value (CSV) file. This file contains a matrix of bus objects (rows) and clock ticks associated with each ISA cycle type (columns).

Figure 18:
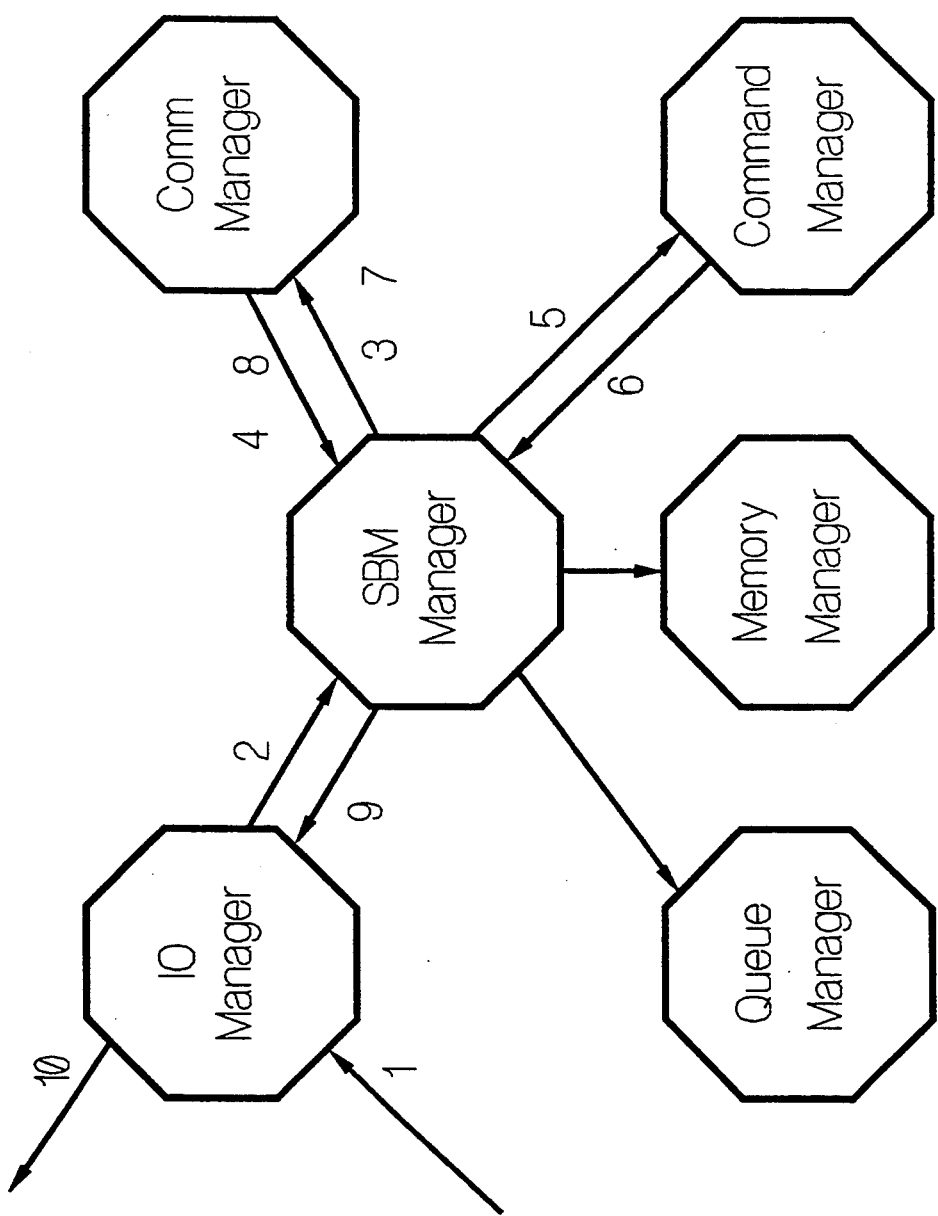
FIG. 18 is a diagram of the message control internal to the SBM circuit.

FIG. 18 depicts the SBM software which includes Message Control Modules and User Defined Modules. The Message Control Modules comprise: SBM Manager (SBMMGR); Queue Manager (QUEUEMGR); Memory Manager (MEMMGR); IO Manager (IOMGR); Communications Manager (COMMGR). The Command Manager (CMDMGR) is the only User-Defined module.

SBMMGR controls the message dispatching. QUEUEMGR controls generic queues and is used to create message queues. MEMMGR controls the memory on the SBM board. COMMGR controls the data link from the SBM to SBMCTRL software. IOMGR controls IO and interrupts on the SBM. CMDMGR controls the gathering and processing of bus information.

The Data Flow is as follows: (1) Data comes in and a communications frame is assembled. This frame contains a data packet and link control information; (2) The frame is passed from IOMGR to COMMGR via the SBMMGR message queue; (3) The control information is processed. If good, the packet is removed from the frame; (4) The packet is passed from COMMGR to CMDMGR via the SBMMGR message queue; (5) The packet is processed. CMDMGR performs the requested action and prepares a response packet; (6) The packet is passed from CMDMGR to COMMGR via the SBMMGR message queue; (7) The packet is put in a frame with control information; (8) The packet is passed from COMMGR to IOMGR via the SBMMGR message queue; (9) The frame is sent; (10) The frame arrives at SBMCTRL.

Using a ROM-based loader program the SBM accepts an image from download software. Download Software reads the image from disk storage and transmits it to the SBM. Once downloaded, the SBM is able to execute the image.

Additions, subtractions, deletions and other modifications of the preferred particular embodiments of the inventions will be apparent to those practiced in the art and are within the scope of the following claims.

What is claimed is:

1. A system bus monitor for monitoring electrical signals generated by each of a plurality of circuit boards including a network interface circuit board, a central processing unit circuit board and a disk interface/controller circuit board, all of said circuit boards being connected to a system bus, said electrical signals initiating and executing bus cycles on said system bus, the system bus monitor comprising:
   a sampling means for preparing, for each bus cycle, at least two bus samples representing the status of said electrical signals at time intervals during said bus cycle,
   a trace memory, connected to said sampling means, for storing said at least two bus samples prepared by said sampling means,
   cycle detection means, connected to said trace memory, for detecting at least one bus cycle in said at least two bus samples stored by said trace memory,
   cycle analysis means, connected to said cycle detection means, for analyzing said at least two bus samples of each said bus cycle identified by said cycle detection means to determine which of said plurality of circuit boards initiated said at least one bus cycle, and
   means for compiling data regarding the use of said system bus by said each of said plurality of circuit boards connected to said system bus, said means for compiling data being connected to said cycle analysis means;
   means for a user to request the resources to be monitored and specific data of said data regarding use of said system bus that should be compiled, said means for requesting being connected to said means for compiling data.

2. The system bus monitor of claim 1 wherein said means for compiling data comprises means to create bus objects and bucket definition objects for each type of cycle performed by a bus object.

3. The system bus monitor of claim 1 further comprising:
   a user interface means for receiving from a user requests for specific data of said data regarding use of said system bus by each of said plurality of circuit boards, and
   display means connected to said user interface means for displaying said data in response to said requests from a user.

4. The system bus monitor of claim 3 further comprising means for determining, for each said circuit board, a percentage of bus cycles generated by said circuit board during a specified period of time.

5. The system bus monitor of claim 1 wherein said plurality of circuit boards includes a board which includes a central processing means for executing software and wherein said system bus monitor further comprises:
   an application status register, connected to said system bus, for storing information regarding the status of software executed by said central processing means,
   a user interface means for specifying a software event to be detected by said system bus monitor, said user interface means being connected to a means for detecting said specified software event, said means for detecting being connected to said system bus; and
   means for setting at least one bit of said application status register upon the occurrence of said specified software event to be detected.

6. The system bus monitor of claim 5 wherein said central processing means comprises:
   means for reading said application status register, and
   means for determining whether said specified event has occurred based on the content of said application status register, said means for determining being connected to said means for reading.

7. The system bus monitor of claim 5 further comprising means for clearing said at least one bit to indicate that said specified event has terminated and wherein said central processing means includes means for reading said application status register to monitor said event.

8. The system bus monitor of claim 5 wherein said cycle analysis means further comprises:
   means for determining a type of each said detected cycle;
   means for determining a beginning and an end of each said detected cycle; and
   means for determining the length of time between a beginning and an end of each said detected cycle, said means for determining the length being connected to said means for determining a beginning and an end of each said detected cycle.

9. The system bus monitor of claim 8 wherein said cycle analysis means further includes, for each of said plurality of circuit boards, means for determining the aggregate length of all cycles initiated by said board.

10. A method of monitoring use of a bus by devices connected to said device comprising the steps of:
    acquiring raw bus signals from said bus and storing said signals in a buffer memory;
    parsing the bus signals stored in said buffer memory into bus cycles;
    grouping statistics relating to said bus cycles into buckets defined by a user of said devices and bus;
    gathering together all buckets relating to a device.

11. The method of monitoring the use of a bus of claim 10 further comprising the step of creating a data object for each bus cycle parsed from said bus signals.

* * * * *